United States Patent
G. U. et al.

(10) Patent No.: US 12,464,459 B2
(45) Date of Patent: Nov. 4, 2025

(54) WIRELESS COMMUNICATION SYSTEMS

(71) Applicant: Intel Corporation, Santa Clara, CA (US)

(72) Inventors: Satish G. U., Karnataka (IN); Abhijeet Prabhakar Palnitkar, Bangalore (IN); Balvinder Pal Singh, Chhattisgarh (IN)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 17/699,332

(22) Filed: Mar. 21, 2022

(65) Prior Publication Data

US 2023/0300748 A1    Sep. 21, 2023

(51) Int. Cl.
*H04W 52/02* (2009.01)
*H04W 24/10* (2009.01)
*H04W 88/06* (2009.01)
*H04W 88/10* (2009.01)

(52) U.S. Cl.
CPC ....... H04W 52/0229 (2013.01); H04W 24/10 (2013.01); H04W 52/0206 (2013.01); *H04W 88/06* (2013.01); *H04W 88/10* (2013.01)

(58) Field of Classification Search
CPC ......... H04W 52/0229; H04W 52/0206; H04W 52/0235; H04W 24/10; H04W 88/06; H04W 88/10; H04W 36/0085; H04W 48/16; H04W 84/12; Y02D 30/70
See application file for complete search history.

(56) References Cited

U.S. PATENT DOCUMENTS

| | | | |
|---|---|---|---|
| 2004/0147223 A1* | 7/2004 | Cho | H04L 12/66 455/552.1 |
| 2008/0247344 A1* | 10/2008 | Bahl | H04W 74/085 370/310 |
| 2016/0323790 A1* | 11/2016 | Wang | H04L 5/0053 |
| 2021/0266805 A1* | 8/2021 | Lee | H04W 8/005 |

OTHER PUBLICATIONS

Pering et al. (Coo/Spots: Reducing the Power Consumption of Wireless Mobile Devices with Multiple Radio Interfaces, MobiSys'06, dated Jun. 19-22, 2006, pp. 220-232, (Year: 2006).*
T. Pering et al. "CoolSpots: Reducing the Power Consumption of Wireless Mobile Devices with Multiple Radio Interfaces", MobiSyS'06, dated Jun. 19-22, 2006, pp. 220-232, Uppsala, Sweden.
A. Gupta et al. Power Consumption and Conservation in WiFi Based Phones: A Measurement-Based Study; IEEE, 10 pages.

* cited by examiner

*Primary Examiner* — Farid Seyedvosoghi
(74) *Attorney, Agent, or Firm* — Viering, Jentschura & Partner mbB

(57) ABSTRACT

A wireless station may include one or more processors. The wireless station may receive a no wireless fidelity (WiFi) signal indicating a parameter. The wireless station may also provide a scan signal comprising a scan list indicating a WiFi frequency band that a cellular modem is to scan for a WiFi signal based on the parameter. In addition, the wireless station may provide a mode signal based on the no WiFi signal. The mode signal may indicate that a WiFi modem is to enter a low power mode. Further, the wireless station may receive a detect signal indicating that the cellular modem detected the WiFi signal within the WiFi frequency band. The wireless station may provide a wake-up signal configured to cause the WiFi modem to enter an operational mode, the wake-up signal indicating a frequency of the detected WiFi signal.

6 Claims, 15 Drawing Sheets

WIRELESS COMMUNICATION SYSTEMS

FIELD

The aspects discussed in the present disclosure are related to wireless communication systems.

BACKGROUND

Unless otherwise indicated in the present disclosure, the materials described in the present disclosure are not prior art to the claims in the present application and are not admitted to be prior art by inclusion in this section.

A user equipment (UE) may include a cellular modem and a wireless fidelity (WiFi) modem. The cellular modem may wirelessly couple the UE to a cellular network. The WiFi modem may wirelessly couple the UE to a WiFi network. The cellular network and the WiFi network may correspond to physical areas of coverage provided by access points (APs). For example, the cellular network may correspond to a physical area of coverage provided by a cellular AP (e.g., a cellular base station) and the WiFi network may correspond to a physical area of coverage provided by a WiFi AP (e.g., a WiFi base station).

A wireless station may include a split stack architecture in which communication operations are split between a controller stack (e.g., a firmware) and a host stack (e.g., an operating system (OS)) of the wireless station. The split stack architecture may perform wireless fidelity (WiFi) operations, Bluetooth (BT) operations, or some combination thereof. The host stack may be implemented as part of a kernel, a middleware, or some combination thereof of the wireless station. The controller stack may communicate with the host stack via a host controller interface (HCI).

A wireless station may wirelessly transmit media content according to a media broadcast technique. The media content may include audio content, video content, or some combination thereof.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which.

DETAILED DESCRIPTION

Figure 1:
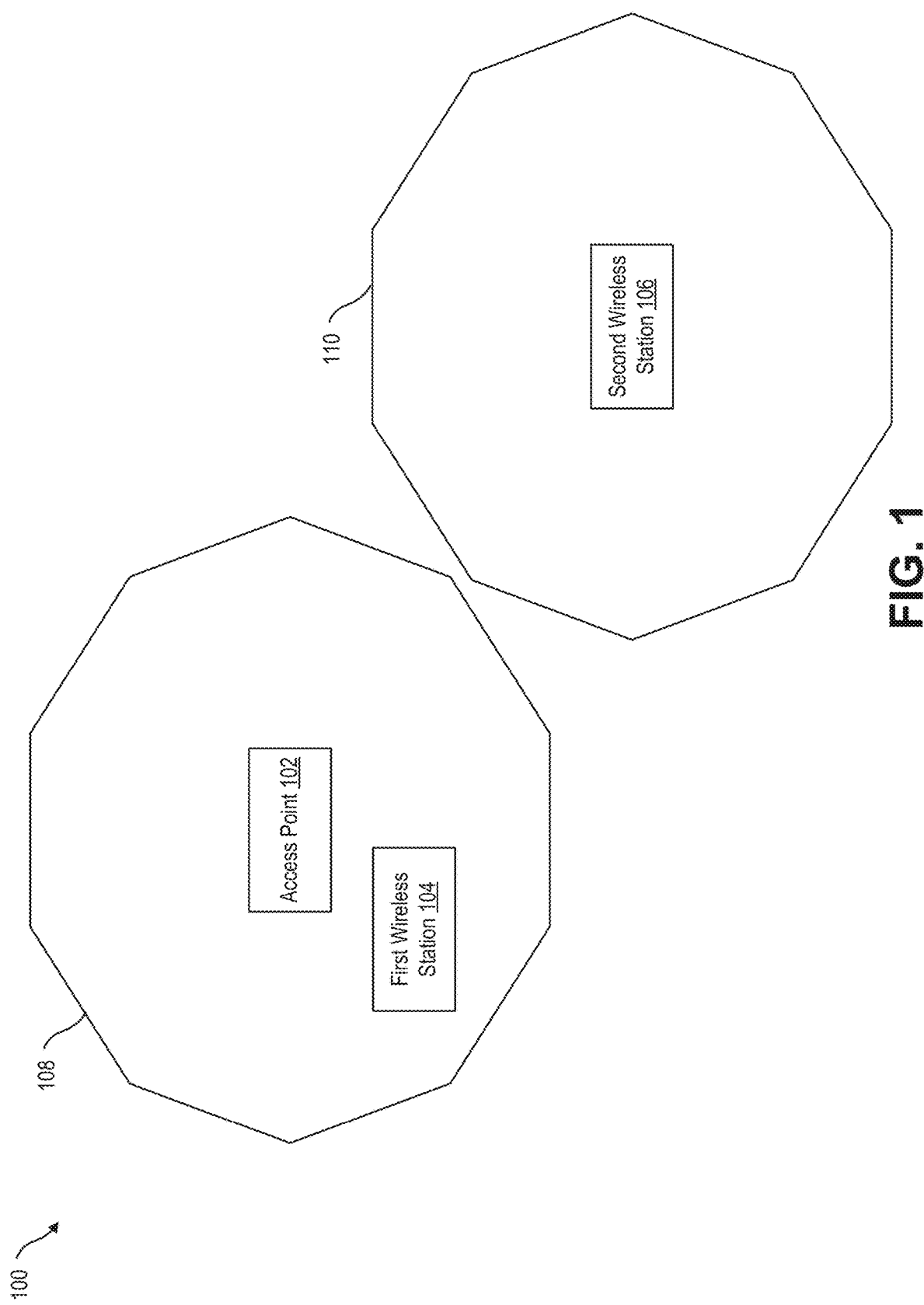
FIG. 1 illustrates a block diagram of an exemplary operational environment for a first wireless station and a second wireless station.

A UE may include a cellular modem and a WiFi modem. The cellular modem may wirelessly couple the UE to a cellular network. The cellular network may include a long-term evolution (LTE), a fifth-generation (5G), or any other appropriate cellular network. The WiFi modem may wirelessly couple the UE to a WiFi network.

The cellular network and the WiFi network may correspond to physical areas of coverage provided by APs. For example, the cellular network may correspond to a physical area of coverage provided by cellular APs (e.g., cellular base stations). Each cellular AP may correspond to a cellular cell that forms part of the cellular network. As another example, the WiFi network may correspond to a physical area of coverage provided by a WiFi AP (e.g., a WiFi base station). The WiFi network may correspond to selected areas such as an office environment, a home environment, a building, or any other appropriate physical area. A portion or all of the physical area corresponding to the WiFi network may overlap a portion of the physical area corresponding to the cellular network. Alternatively, none of the physical area corresponding to the WiFi network may overlap the physical area corresponding to the cellular network.

The UE may receive and generate signals within a WiFi frequency (e.g., WiFi frequency bands). The WiFi frequency may include one or more unlicensed frequency bands, one or more frequency bands between a two gigahertz (GHz) band (e.g., 2.4-2.4853 GHz) and a five GHz band (5.725-5.85 GHz), a WiFi6 band (5.925 GHz to 7.125 GHz), or any other appropriate WiFi frequency band. The UE may receive and generate signals within a cellular frequency (e.g., cellular frequency bands). The cellular frequency may include one or more frequency bands of 2110 megahertz (MHz) to 2170 MHz, 1930 MHz to 1990 MHz, 2620 MHz to 2690 MHz, or any other appropriate cellular frequency band. The UE may receive the signals within the WiFi frequency and the cellular frequency via a reception path (e.g., one or more antennas, one or more bandpass filters, one or more local oscillators, one or more mixers, one or more down conversion filters, and one or more analog to digital converters).

The UE may cause the cellular modem to transition between an operational mode and a low power mode based on detection of the cellular network. The low power mode may include a mode in which the cellular modem powers down one or more components, reduces an operation frequency, reduces a voltage of one or more components, or some combination thereof. The cellular modem may scan the cellular frequency and the UE may determine the signal strength of the cellular signal based on the scan of the cellular frequency. The UE may cause the cellular modem to transition between the operational mode and the low power mode based on a measured signal strength of a cellular signal (e.g., one or more signals within the cellular frequency).

The UE may cause the WiFi modem to transition between the operational mode and the low power mode based on detection of the WiFi network. The low power mode may include a mode in which the WiFi modem powers down one or more components, reduces an operation frequency, reduces a voltage of one or more components, or some combination thereof. The UE may cause the WiFi modem to transition between the operational mode and the low power mode based on a measured signal strength of a WiFi signal (e.g., one or more signals within the WiFi frequency). The UE may determine the signal strength of the WiFi signal based on a scan of the WiFi frequency.

In some WiFi technologies, the UE may cause the WiFi modem to periodically transition from the low power mode to a search mode to scan the WiFi frequency. In these and other WiFi technologies, the UE may cause the WiFi modem to scan the WiFi frequency regardless of whether the UE is proximate a wireless AP (e.g., within the physical area corresponding to the WiFi network). The UE causing the WiFi modem to transition from the low power mode to the search mode may increase power consumption of the UE (e.g., may increase drain of a battery of the UE). In some WiFi technologies, the UE may determine a physical location of the UE and may cause the WiFi modem to scan the WiFi frequency if the physical location of the UE corresponds to a known physical area of a WiFi network. The WiFi modem scanning the WiFi frequency when the WiFi network is not present may increase power consumption and overhead of the UE.

Some aspects described in the present disclosure may offload scanning of the WiFi frequency to the cellular modem. The cellular modem may scan the WiFi frequency and the UE may determine the signal strength of the WiFi signal based on the scan by the cellular modem. In addition, the WiFi modem may operate in the low power mode while the cellular modem scans the WiFi frequency. The cellular modem may scan the WiFi frequency in addition to the cellular frequency. The cellular modem may scan the cellular frequency and the WiFi frequency as part of handover operations performed by the UE and the cellular modem.

A UE (e.g., a wireless station) may include one or more processors. The processors may receive a no WiFi signal indicating a parameter. The processors may also provide a scan signal. The scan signal may include a scan list indicating a WiFi frequency that a cellular modem is to scan for a WiFi signal based on the parameter. In addition, the processors may provide a mode signal based on the no WiFi signal. The mode signal may indicate that a WiFi modem is to enter a low power mode or a complete power down mode. Further, the processors may receive a detect signal. The detect signal may indicate that the cellular modem detected the WiFi signal within the WiFi frequency. The processors may provide a wake-up signal to cause the WiFi modem to enter an operational mode. The wake-up signal may indicate a frequency of the detected WiFi signal.

A UE (e.g., a wireless station) may include a cellular modem. The cellular modem may include one or more processors. The processors may receive a scan signal. The scan signal may include a scan list indicating a WiFi frequency to scan for a WiFi signal. The processors may also scan the WiFi frequency for the WiFi signal. In addition, the processors may determine a total signal power of the WiFi frequency based on the scan. Further, the processors may provide a detect signal indicating that the total signal power exceeded a threshold value. The detect signal may be configured to cause the control device to provide a wake-up signal configured to cause a WiFi modem to enter an operational mode.

The cellular modem scanning the WiFi frequency while the WiFi modem is in the low power mode may reduce power consumption of the UE. For example, the cellular modem scanning the WiFi frequency may reduce the power consumption of the UE by roughly two hundred fifty milliwatts (mW), which may extend a battery life of the UE by two hours. As an example, a reduced power consumption for a five-hour period of time in which the cellular modem scans the WiFi frequency and the WiFi modem is in the low power mode may be determined according to Equation 1.

$$E = PT = 256 \text{ mW}(5 \text{ hours})\left(\frac{3600 \text{ Joules}}{\text{hour}}\right) \quad \text{Equation 1}$$

An interworking between the WiFi modem and the cellular modem may be increased. The UE may dynamically switch between the WiFi modem and the cellular based on detection of the WiFi network. In addition, the cellular modem may already be preconfigured to receive signals within the WiFi frequency.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an exemplary operational environment 100 for a first wireless station 104 and a second wireless station 106, in accordance with at least one aspect described in the present disclosure. The operational environment 100 may include a WiFi network 108 and an out of network area 110. The WiFi network 108 may correspond to a physical area of coverage provided by an AP 102. A first wireless station 104 may be physically located within the physical area of coverage of the WiFi network 108. In addition, the out of network area 110 may correspond to a physical area of a second wireless station 106 that is physically positioned outside of the WiFi network 108.

The first wireless station 104, the second wireless station 106, or some combination thereof may include, or may be implemented, partially or entirely, by circuitry and/or logic. Additionally or alternatively, one or more functionalities of the first wireless station 104, the second wireless station 106, or some combination thereof may be implemented by logic, which may be executed by a machine and/or one or more processors. The first wireless station 104 and the second wireless station 106 may each include at least one memory (not illustrated in FIG. 1), which may be configured to store at least some of the information processed by the first wireless station 104, the second wireless station 106, or some combination thereof. Examples of the first wireless station 104, and the second wireless station 106 may include, but are not limited to, a smartphone, a laptop computer, a computing device, a tablet computer, a mobile phone, a personal digital assistant (PDA), an e-reader device, a desktop computer, or any other appropriate device.

The first wireless station 104 and the second wireless station 106 may perform active and passive scanning to detect the WiFi network 108. The second wireless station 106 may determine the second wireless station 106 is not within the physical area of the WiFi network 108 (e.g., may determine the second wireless station 106 is within the out of network area 110). Additionally or alternatively, the second wireless station 110 may determine the second wireless station 106 is within the out of network area 110 based on a no WiFi signal received from the AP 102 prior to leaving the WiFi network 108.

Figure 2:
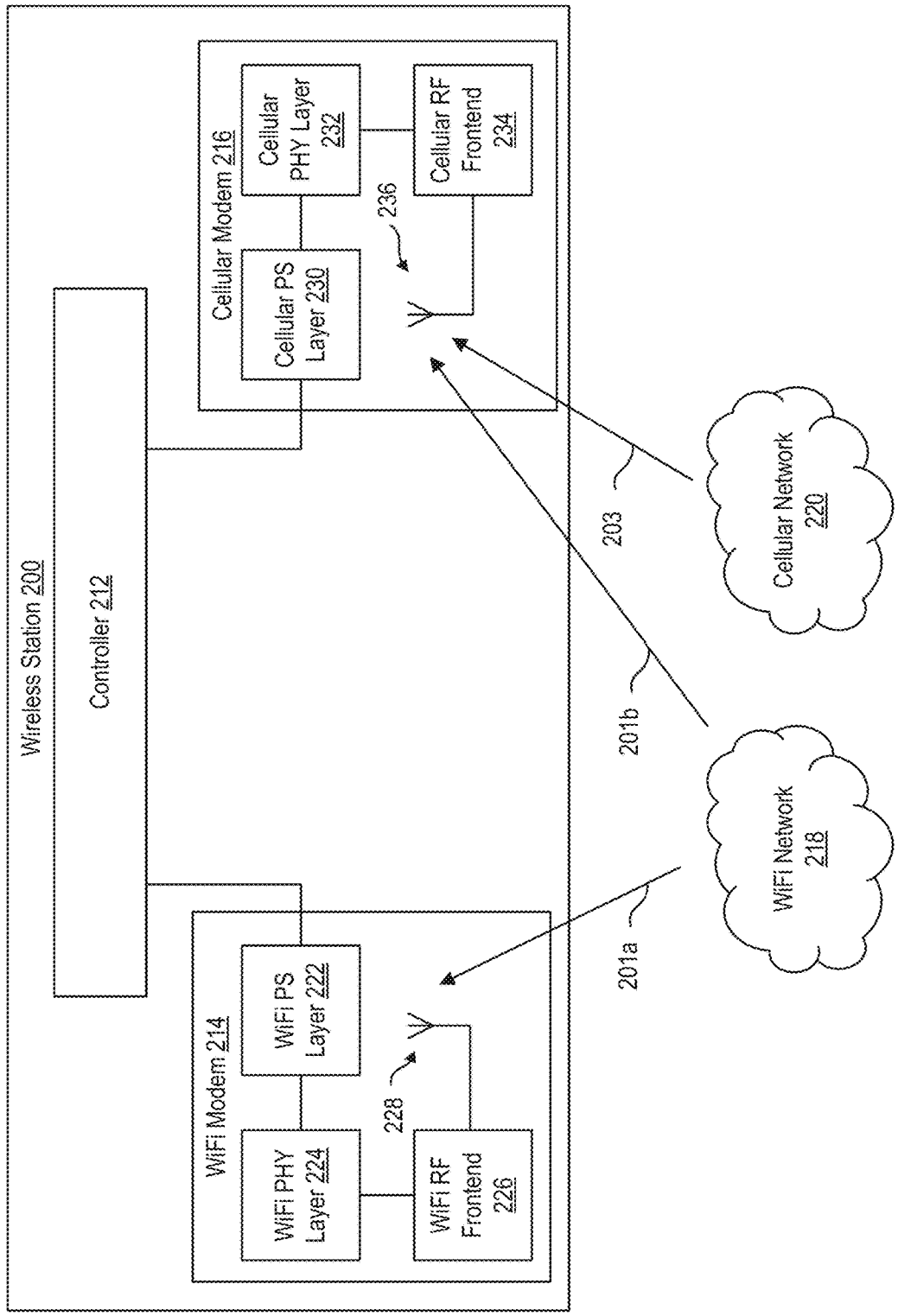
FIG. 2 illustrates a block diagram of an exemplary wireless station that may be implemented in the environment of FIG. 1.

FIG. 2 illustrates a block diagram of an exemplary wireless station 200 that may be implemented in the environment of FIG. 1, in accordance with at least one aspect described in the present disclosure. The wireless station 200 may correspond to the first wireless station 104, the second wireless station 106, or some combination thereof of FIG. 1. The wireless station 200 may include a controller 212, a WiFi modem 214, and a cellular modem 216. The controller 212 may include one or more processors (not illustrated in FIG. 2).

The WiFi modem 214 may include a WiFi packet switching (PS) layer 222, a WiFi physical (PHY) layer 224, a WiFi radio frequency (RF) frontend 226, and a WiFi antenna 228. The WiFi PS layer 222, the WiFi PHY layer 224, the WiFi RF frontend 226, and the WiFi antenna 228 may form a WiFi reception path, a WiFi transmission path, or some combination thereof of the wireless station 200. The WiFi modem 214 may be wirelessly coupled to a WiFi network 218. The WiFi network 218 may correspond to the WiFi network 108 of FIG. 1. The WiFi modem 214 may receive a WiFi signal 201a from the WiFi network 108.

The cellular modem 216 may include a cellular PS layer 230, a cellular PHY layer 232, a cellular RF frontend 234, and a cellular antenna 236. The cellular PS layer 230, the cellular PHY layer 232, the cellular RF frontend 234, and the cellular antenna 236 may form a cellular reception path, a cellular transmission path, or some combination thereof of the wireless station 200. The cellular modem 216 may be wirelessly coupled to a cellular network 220. The cellular modem 216 may receive a cellular signal 203 from the cellular network 220. In addition, the cellular modem 216 may receive a WiFi signal 201b from the WiFi network 218. The WiFi signal 201a and the WiFi signal 201b are illustrated as separate signals in FIG. 2. However, the WiFi signal 201a and the WiFi signal 201b may include the same signal transmitted in multiple directions by the WiFi network 218. The WiFi signal 201a and the WiFi signal 201b are generally referred to in the present disclosure as "WiFi Signal 201."

The WiFi Signal 201 may indicate that the wireless station 200 is about to exit the physical area corresponding to the WiFi network 218. For example, the wireless station 200 may approach a boundary of the physical area corresponding to the WiFi network 218 and the WiFi signal 201 may indicate as such. The WiFi signal 201 may also indicate a parameter of the WiFi network 218 for detecting the WiFi signal 201.

The WiFi antenna 228 may receive the WiFi signal 201a. The WiFi antenna 228 may generate an analog WiFi signal based on the WiFi signal 201a. The WiFi RF frontend 228 may receive the analog WiFi signal from the WiFi antenna 228. The WiFi RF frontend 226 may convert the analog WiFi signal to generate a filtered WiFi signal. The WiFi RF frontend 226 may convert the analog WiFi signal to a power level that is compatible with the WiFi PHY layer 224. For example, the WiFi RF frontend 226 may filter out portions or may reduce an amplitude of the analog WiFi signal.

The WiFi PHY layer 224 may receive the filtered WiFi signal from the WiFi RF frontend 226. The WiFi PHY layer 224 may convert the filtered WiFi signal to a data signal that includes packets representative of data within the WiFi signal 201a (e.g., the parameter). The WiFi PS layer 222 may shape the packets within the data signal to generate a no WiFi signal. The no WiFi signal may be generated in a format that is compatible with the controller 212. The no WiFi signal may include data representative of the parameter. Alternatively, the no WiFi signal may be generated by the WiFi PS layer 222 based on a power level of the WiFi signal 201a being less than a threshold value.

The controller 212 may determine the wireless station 200 is leaving or outside the physical area corresponding to the WiFi network 218 based on the no WiFi signal. The controller 212 may provide a scan signal to the cellular PS layer 230. The scan signal may include a scan list that indicates the WiFi frequency that the cellular modem 216 is to scan. The scan list may be generated based on the parameter. In addition, the controller 212 may provide a mode signal to the WiFi modem 214 based on the no WiFi signal. The mode signal may indicate that the WiFi modem 214 is to enter the low power mode or a complete power down mode.

The cellular modem 216 may scan the WiFi frequency based on the scan signal and the scan list. The cellular antenna 236 may receive the WiFi signal 201b during the scan. The cellular antenna 228 may generate another analog WiFi signal based on the WiFi signal 201b. The cellular RF frontend 234 may receive the another analog WiFi signal from the cellular antenna 236. The cellular RF frontend 234 may convert the another analog WiFi signal to generate another filtered WiFi signal. The cellular RF frontend 234 may convert the another analog WiFi signal to a power level that is compatible with the cellular PHY layer 232. For example, the cellular RF frontend 234 may filter out portions or may reduce an amplitude of the another analog WiFi signal.

The cellular PHY layer 232 may receive the another filtered WiFi signal from the cellular RF frontend 234. The cellular PHY layer 232 may convert the another filtered WiFi signal to another data signal. The cellular PS layer 222 may shape the packets within the data signal to generate a detect signal representative of a power level of the WiFi signal 201b. The controller 212 may determine a total signal power of the WiFi signal 201b based on the detect signal. Alternatively, the controller 212 may receive the detect signal from the cellular RF frontend 234 and directly determine the total signal power of the WiFi signal 201b.

Responsive to the total power level of the WiFi signal 201b exceeding a threshold value, the controller 212 may provide a detect signal to the cellular modem 214. The detect signal may indicate the total signal power of the WiFi signal 201b exceeded the threshold value (e.g., that the cellular modem 216 detected the WiFi signal 201b). The detect signal may cause the cellular modem 216 to stop scanning the WiFi frequency. The controller 212 may also provide a wake-up signal to the WiFi modem 214. The wake-up signal may cause the WiFi modem 214 to enter the operational mode. In addition, the wake-up signal may indicate a frequency of the WiFi signal 201b. In addition, the controller 212 may determine whether a pilot channel of the WiFi signal 201b is detected.

Figure 3:
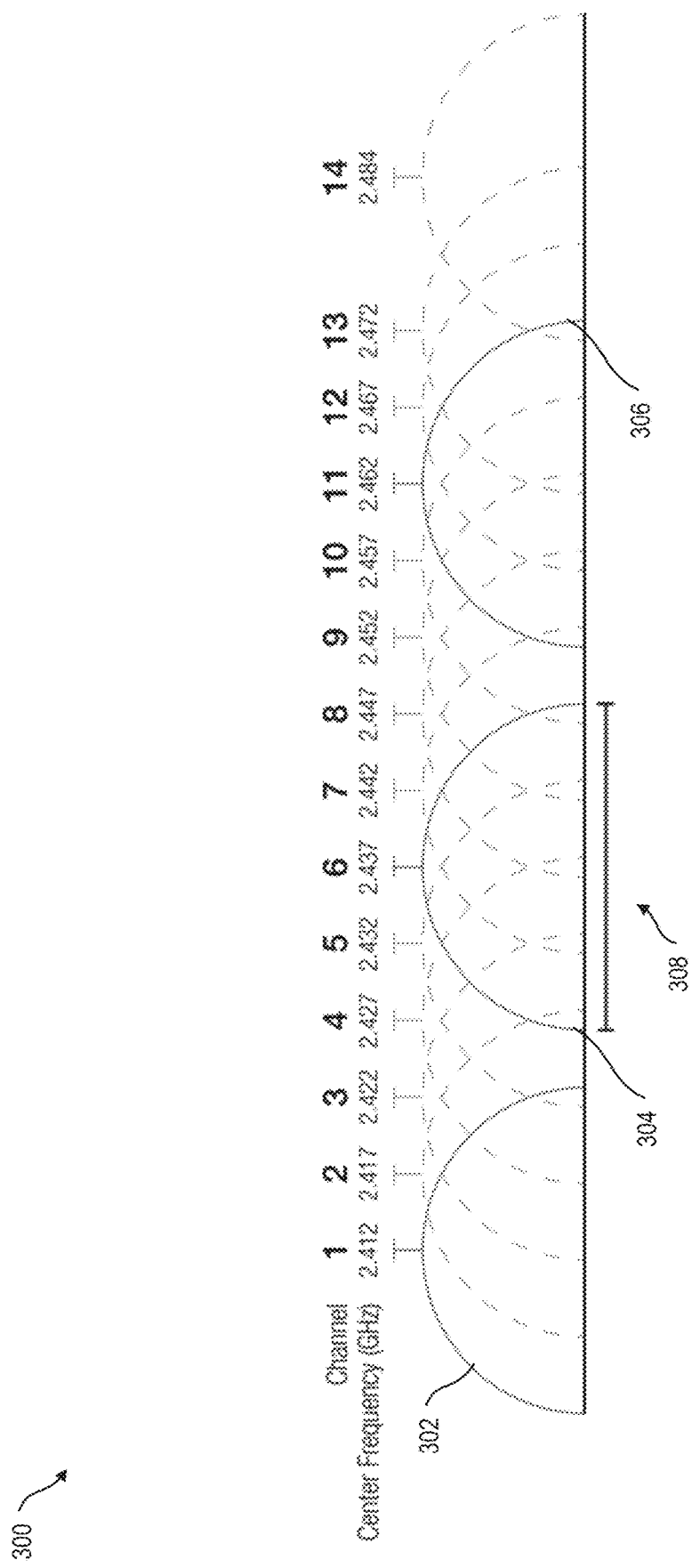
FIG. 3 illustrates a graphical representation of WiFi frequency channels and a bandwidth (BW) of the WiFi frequency channels.

FIG. 3 illustrates a graphical representation 300 of WiFi frequency channels 302, 304, and 306 and a BW 308 of the WiFi frequency channels 304, in accordance with at least one aspect described in the present disclosure. Only three frequency channels 302, 304, and 306 are numbered in FIG. 3 for ease of illustration and discussion. Only a single BW 308 of the frequency channel 304 is also numbered in FIG. 3 for ease of illustration and discussion.

The frequency channels may be allocated at five MHz spacing within the WiFi frequency. The frequency channels may correspond to industrial, science and medical (ISM) channels. The frequency channels may include a center frequency. For example, the frequency channel 302 may include a center frequency of 2.412 GHz, the frequency channel 304 may include a center frequency of 2.437 GHz, and the frequency channel 306 may include a center frequency of 2.462 GHz. The frequency channels 302, 304, and 306 may be selected for the cellular modem to scan for the WiFi signal as they provide a large range of non-overlapping frequencies to scan for the WiFi signal.

Figure 4:
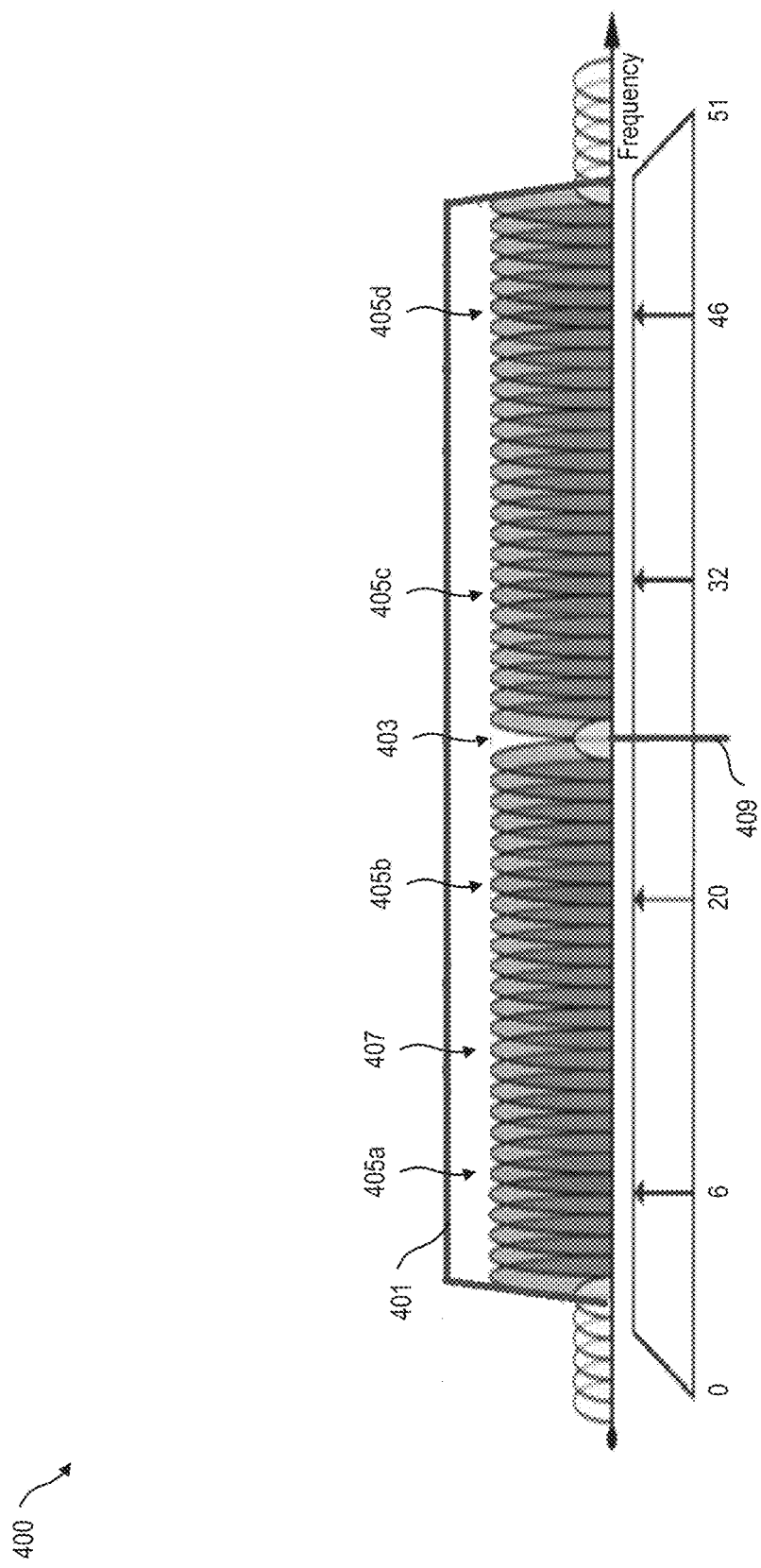
FIG. 4 illustrates a graphical representation of a frequency channel.

FIG. 4 illustrates a graphical representation 400 of a frequency channel 401, in accordance with at least one aspect described in the present disclosure. The frequency channel 401 may include a null channel 403, pilot channels 405a-d, and a data channel 407. A single data channel 407 is numbered in FIG. 4 for ease of illustration and discussion. The null channel 403 may correspond to a center frequency 409 of the frequency channel 401.

To detect the pilot channels 405a-d, a frequency of in-phase and quadrature (IQ) samples of the WiFi signal may be rotated by a degree that is equal to a separation between the center frequency at a baseband frequency and the pilot channels 405a-d. In OFDM based WiFi system, a pilot channel may include a predefined subcarrier that includes a BW of one subcarrier spacing ($\Delta f$). The pilot channel may occupy a total power of the pilot channels 405a-d, which may be determined according to Equations 2-4.

$$I[n]=I[n]e(-j\phi) \qquad \text{Equation 2}$$

$$Q[n]=Q[n]e(-j\phi) \qquad \text{Equation 3}$$

$$\text{Total power}=\Sigma\sqrt{I[n]^2+Q[n]^2} \qquad \text{Equation 4}$$

In Equation 2-4, I[n] and Q[n] represent an $n^{th}$ In-Phase and Quadrature Phase sample from I and Q analog to digital converters (ADCs). $\Phi$ represents the total phase difference of ($\phi=2\pi f_{diff}$), in which $f_{diff}$ represents a frequency difference between a WiFi band center frequency and a location of the pilot frequency. If the I, Q samples are rotated by an angle of $-\phi$, then the pilot channel may shift to direct current (DC) frequency (e.g., zero Hz). If a pilot subcarrier is span over m samples, then after rotation, m number of I, Q samples may be summed to determine the total power of Pilot signal.

If the total power of the pilot channels 405a-d, exceeds a pilot threshold value, the detect signal may further indicate the pilot channels 405a-d are detected.

Figure 5:
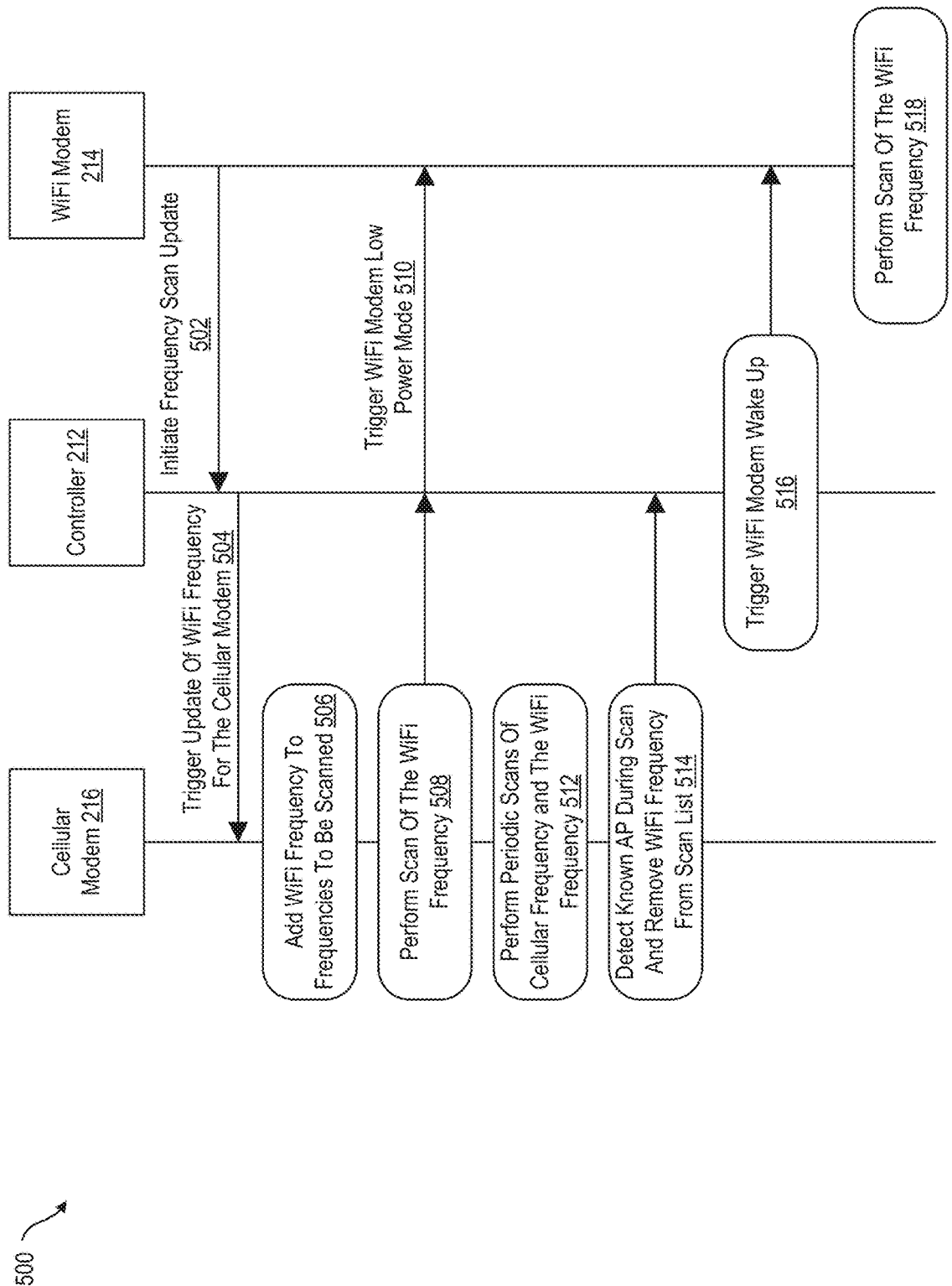
FIG. 5 illustrates an exemplary message sequence chart for the cellular modem to scan the WiFi frequency.

FIG. 5 illustrates an exemplary message sequence chart 500 for the cellular modem 216 to scan the WiFi frequency, in accordance with at least one aspect described in the present disclosure. The messages of the message sequence chart 500 may be transmitted and received by any suitable system, apparatus, or device with respect to the cellular modem 216 scanning the WiFi frequency. For example, the cellular modem 216, the controller 212, and the WiFi modem 214 may transmit and receive the messages of the message sequence chart 500.

The WiFi modem 214 may initiate a frequency scan update 502 to the controller 212. The initial frequency scan update 502 may indicate the channels of the WiFi frequency that are to be scanned to detect the WiFi signal. The controller 212 may trigger an update of the WiFi frequency for the cellular modem 504. The controller 212 may trigger the update of the WiFi frequency by providing an updated scan list to the cellular modem 216.

The cellular modem 216 may add the WiFi frequency to the frequencies to be scanned 506 by the cellular modem 216. The cellular modem 216 may perform scan of the WiFi frequency 508. The controller 212 may trigger the WiFi modem 214 low power mode 510. The low power mode may prevent the WiFi modem 214 from periodically powering up to scan the WiFi frequency for the WiFi signal.

The cellular modem 216 may perform periodic scans of the cellular frequency and the WiFi frequency 512. The cellular modem 216 may periodically scan the WiFi frequency to detect the WiFi signal. The cellular modem 216 may detect a known AP during the scan of the WiFi frequency and remove the WiFi frequency from the scan list 514. The cellular modem 216 may provide the detect signal to the controller 212 based on the detected known AP.

The cellular modem 212 may trigger a WiFi modem 214 wake up 516. For example, the cellular modem 212 may provide the wake-up signal the WiFi modem 214. The WiFi modem 214 may perform scan of the WiFi frequency based on the wake-up signal and to detect the WiFi signal 518.

Figure 6:
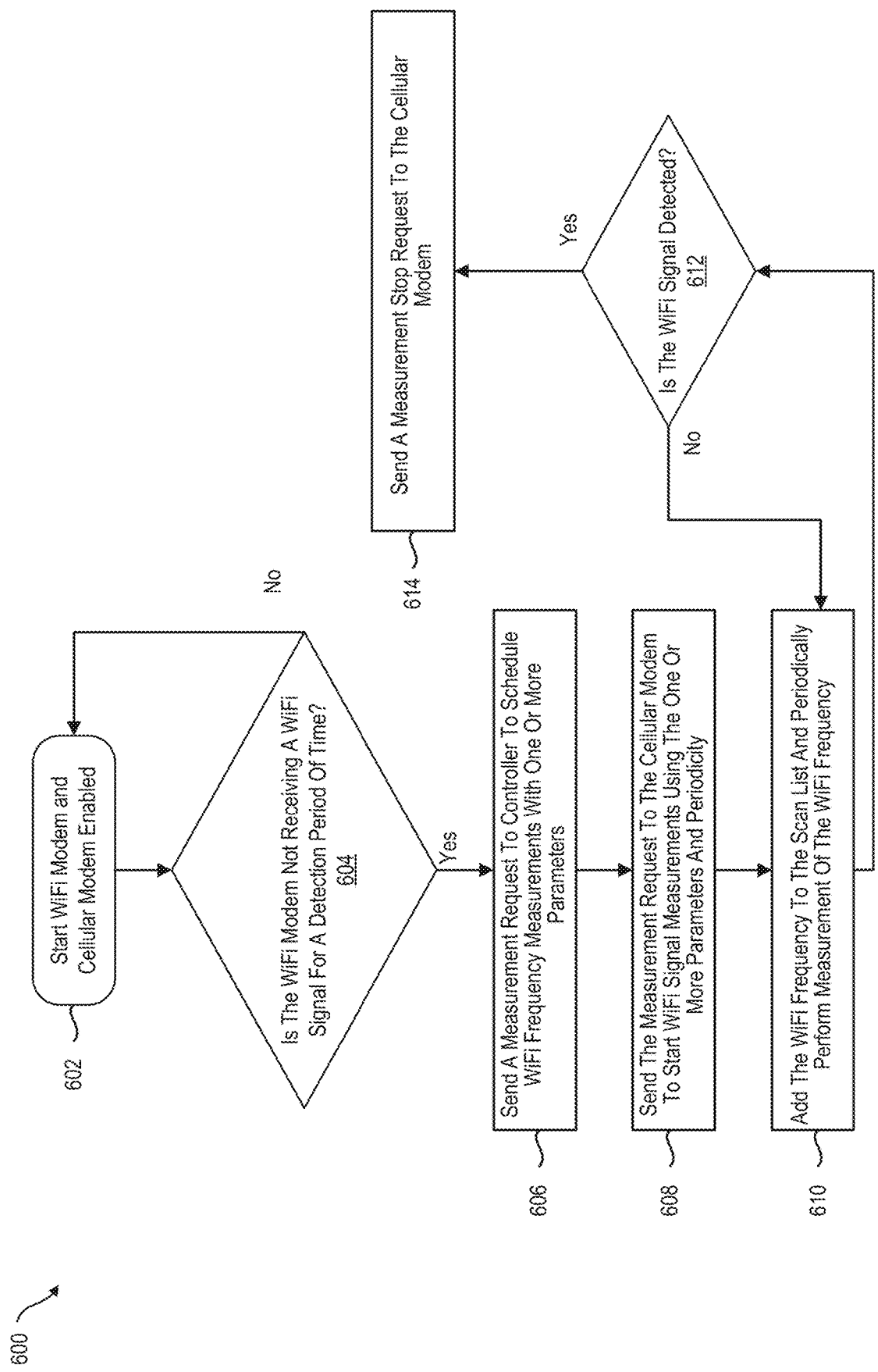
FIG. 6 illustrates a flowchart of an exemplary method to cause the cellular modem to scan the WiFi frequency.

FIG. 6 illustrates a flowchart of an exemplary method 600 to cause the cellular modem to scan the WiFi frequency, in accordance with at least one aspect described in the present disclosure. The method 600 may be performed by any suitable system, apparatus, or device with respect to scanning the WiFi frequency and determining a total power of a detected WiFi signal. For example, the controller 212, the WiFi modem 214, the cellular modem 216, or some combination thereof of FIG. 2 may perform or direct performance of one or more of the operations associated with the method 600. The method 600 is described in relation to FIG. 6 as being performed by the controller 212, the WiFi modem 214, and the cellular modem 216 for example purposes. The method 600 may include one or more blocks 602, 604, 606, 608, 610, 612, and 614. Although illustrated with discrete blocks, the operations associated with one or more of the blocks of the method 600 may be divided into additional blocks, combined into fewer blocks, or eliminated, depending on the particular implementation.

At block 602, the controller 212 may cause the WiFi modem 214 and the cellular modem 216 to start enabled. Block 602 may be followed by block 604. At block 604, the controller 212 may determine whether the WiFi modem 214 is not receiving a WiFi signal for a detection period of time. For example, the controller 212 may determine if a no WiFi signal has been received from an AP. As another example, the controller 212 may determine if the total power of signals within the WiFi frequency are below the threshold value. If the WiFi modem 214 has not received the WiFi signal for a detection period of time, block 604 may be followed by block 606. If the WiFi modem receives the WiFi signal within the detection period of time, block 604 may be followed by block 602 and the WiFi modem may continue to be enabled.

At block 606, the WiFi modem 214 may send a measurement request to the controller 212 to schedule WiFi frequency measurements with one or more parameters. For example, the WiFi modem 214 may provide a no WiFi signal that includes the one or more parameters to the controller 212. Block 606 may be followed by block 608.

At block 608, the controller 212 may send the measurement request to the cellular modem 216 to start WiFi signal measurements using the one or more parameters and periodicity. The periodicity may indicate an amount of time that is to elapse between scans by the cellular modem 216. Block 608 may be followed by block 610.

At block 610, the cellular modem 216 may add the WiFi frequency to the scan list and may periodically perform measurement of the WiFi frequency. Block 610 may be followed by block 612. At block 612, the controller 212 may determine whether the WiFi signal is detected. For example, the controller 212 may determine a total power of signals within the WiFi frequency. As another example, the controller 212 may determine if the detect signal has been received from the cellular modem 216. If the WiFi signal is detected, block 612 may be followed by block 614. If the WiFi signal is not detected, block 612 may be followed by block 610. Blocks 610 and 612 may be repeated until the WiFi signal is detected. At block 614, the controller 212 may send a measurement stop request to the cellular modem 216.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

The UE may cause the WiFi modem to transition to the low power mode if the total signal power of the WiFi signal is equal to or less than the threshold value. The WiFi modem operating in the low power mode when no WiFi signal is detected may reduce power consumption of the UE. Alternatively, if the signal strength of the WiFi signal is greater than the threshold value, the UE may cause the WiFi modem to transition to or continue to operate in the operational mode to enable full operation of the WiFi modem.

The UE may determine if a detection period of time has elapsed between detection of the WiFi signal. The UE may instruct the cellular modem to start Wi-Fi signal measurements (e.g., inter frequency measurements). The UE may also indicate one or more WiFi parameters. For example, the WiFi parameters may include a center frequency, a BW, or some combination thereof of the WiFi signal. In addition, the UE may cause the WiFi modem to enter the lower power mode.

The cellular modem may measure the WiFi signal to identify the presence of the WiFi network. The cellular modem, in response to receiving the WiFi signal measurement request, may add a measurement task to a neighbor measurement list that indicates the frequency (e.g., a channel number), a BW, a pilot channel frequency, a sampling frequency, or other parameters, along with the measurement interval. The cellular modem may periodically perform the measurements (e.g., may periodically scan the WiFi frequency). If the cellular modem does not detect the WiFi signal, the cellular modem may indicate such to the controller and the WiFi modem may not be enabled (e.g., may not transition to the operation mode).

The cellular modem may be tuned to WiFi center frequencies and the BW. The WiFi center frequencies may include channels one, six, and eleven. The cellular mode may adjust the scanned WiFi frequency, the BW, the sampling frequencies, or some combination there based on the presence of a pilot channel. The controller may determine the total power for twenty MHz spacing of the WiFi frequency channels. If the cellular modem or the controller detect signal power that is greater than the threshold value, the controller may cause the WiFi modem to transition to the operation mode. The cellular modem may not synchronize with a WiFi AP to detect the WiFi signal.

The cellular modem or the controller may also determine presence of pilot channels in the WiFi frequency. The cellular modem or the controller may capture and rotate IQ samples by an angle that is equal to a distance between a center frequency of the channel and a pilot frequency in the channel. The cellular modem or the controller may determine the total power of the pilot channel. If the total power of pilot a sub-carrier exceeds a pilot threshold value, the cellular modem or the controller may have verified that a WiFi pilot channel is also being detected.

The threshold value or the pilot threshold value may be equal to or between negative fifty decibel milliwatts (dBm) and negative seventy dBm. The total power of the WiFi signal may be determined by summing the square of the in-phase sample and the quadrature sample.

If the WiFi signal is detected, the controller may provide a wake-up signal to the WiFi modem to cause the modem to transition to the operation mode. In addition, the controller may instruct the cellular modem to stop scanning the WiFi frequency (e.g., to remove the WiFi frequency from the scan list).

A UE (e.g., a wireless station) may include one or more processors. The one or more processor may be configured to perform or control various operations of the UE. The UE may receive a no WiFi signal indicating a parameter. The UE may update the scan list to include the WiFi frequency. The scan list may include the WiFi frequency in addition to the cellular frequency based on the detection of no WiFi signal. The UE may receive the no WiFi signal after a detection period of time elapses in which the WiFi modem does not detect the WiFi signal.

The UE may provide a scan signal to the cellular modem. The scan signal may include a scan list indicating the WiFi frequency that the cellular modem is to scan for the WiFi signal. the scan list may be based on the parameter. The parameter may include a center frequency of a frequency channel, a BW of the frequency channel, a pilot channel frequency of the frequency channel, a sampling frequency of the frequency channel, a measurement interval, or some combination thereof. The scan list may also indicate one or more cellular frequencies that the cellular modem is to scan for one or more cellular signals.

The WiFi frequency may include a frequency channel including a twenty-two MHz BW. The WiFi frequency may include non-overlapping frequency channels. The WiFi frequency may include an unlicensed frequency band. The WiFi frequency may be equal to or between a two GHz band (2.4-2.4853 GHz), a five GHz band (5.725-5.85 GHz), a WiFi6 band (5.925 GHz to 7.125 GHz), or any other appropriate WiFi frequency band.

The UE may provide a mode signal based on the no WiFi signal to the WiFi modem. The mode signal may indicate that the WiFi modem is to enter the low power mode or a complete power down mode.

The UE may receive a detect signal indicating that the cellular modem detected the WiFi signal within the WiFi frequency. For example, the controller may receive the detect signal from the cellular mode. The detect signal may indicate that the cellular modem detected a total signal power within the WiFi frequency that is equal to or greater than the threshold value. The cellular modem may detect the total signal power within the WiFi frequency without synchronizing with a corresponding WiFi AP. The threshold value may be equal to or greater than negative seventy dBm. The detect signal may also indicate that a WiFi pilot channel within the WiFi frequency was also detected.

The UE may provide a wake-up signal. The wake-up signal may cause the WiFi modem to enter the operational mode. The wake-up signal may also indicate a frequency of the detected WiFi signal.

The UE may compare a center frequency of the detected WiFi signal to a pre-identified center frequency. Responsive to the center frequency of the detected WiFi signal being the same as the center frequency of the pre-identified center frequency, the wake-up signal may also indicate that the detected WiFi signal corresponds to a particular access point.

The UE may include the WiFi modem. The UE may receive the no WiFi signal from the WiFi modem. The UE may also provide the mode signal to the WiFi modem. In addition, the UE may provide the wake-up signal to the WiFi modem. The UE may include the cellular modem. The UE may provide the scan signal to the cellular modem. The UE may also receive the detect signal from the cellular modem.

A UE (e.g., a wireless station) may include a cellular modem. The cellular modem may include one or more processors. The cellular modem may receive a scan signal including a scan list indicating a WiFi frequency to scan for a WiFi signal. The scan list may also indicate one or more cellular frequencies to scan for one or more cellular signals. The scan list may include a center frequency of a frequency channel, a BW of the frequency channel, a pilot channel frequency of the frequency channel, a sampling frequency of the frequency channel, a measurement interval, or some combination thereof.

The cellular modem may scan the WiFi frequency for the WiFi signal. The WiFi frequency may include non-overlapping frequency channels. The WiFi frequency may include an unlicensed frequency band.

The cellular modem may determine a total signal power of the WiFi frequency based on the scan. The cellular modem may provide a detect signal to the controller. The detect signal may indicate that the total signal power exceeded a threshold value. The detect signal may cause the controller (e.g., the control device) to provide a wake-up signal to cause a WiFi modem to enter an operational mode. The threshold value may be equal to or greater than negative seventy dBm. The cellular modem may compare a center frequency of the WiFi frequency to a pre-identified center frequency. Responsive to the center frequency of the WiFi frequency being the same as the center frequency of the pre-identified center frequency, the detect signal may also indicate that the WiFi frequency corresponds to a particular access point.

The cellular modem may measure a total signal power of a pilot channel within the WiFi frequency. Responsive to the total signal power of the pilot channel exceeding a pilot threshold value, the detect signal may also indicate that the pilot channel was also detected.

The cellular modem may determine the total signal power within the WiFi frequency without synchronizing with a corresponding WiFi access point.

The UE may include the controller (e.g., the control device) and the WiFi modem. The cellular modem may receive the scan signal from the controller. The cellular modem may provide the detect signal to the control device.

A wireless station may include a split stack architecture in which communication operations are split between a controller stack (e.g., a firmware) and a host stack (e.g., an OS) of the wireless station. The split stack architecture may perform WiFi operations, BT operations, or some combination thereof. The host stack may be implemented as part of a kernel, a middleware, or some combination thereof of the wireless station. The controller stack may communicate with the host stack via a HCI.

The HCI may induce a delay in the communication between the controller stack and the host stack. The delay may increase an overhead of the wireless station. For example, the delay in the communication may delay a connection procedure between the wireless station and a peer device. In addition, the delay may negatively impact user key experience indicator (KEI) metrics. For example, the delay may increase the KEI metrics of a connect time, a reconnect time (in heavy or non-heavy traffic scenarios), or some combination thereof of the peer device and the wireless station. Some BT technologies may implement a BT whitelist in the controller stack.

Some aspects described in the present disclosure may build context in the controller stack. The controller stack may identify a peer device that is to connect to the wireless station as a known, a trusted, or a previously connected peer device based on the context. If the controller stack identifies the peer device as a previously connected peer device, the controller stack may perform a revised connection procedure with the peer device using a connection parameter saved in a memory of the controller stack rather than communicating with the host stack via the HCI.

The controller stack may receive a connect request from the peer device. The connect request may include an address (e.g., a media access control (MAC) address) corresponding to the peer device. The address may include a WiFi access point (AP) address, a WiFi direct MAC address, a BT AP address, a BT direct MAC address, or some combination thereof. The controller stack may hash the address to generate an address value. The host stack may compare the address value to an aggregate value of a bloom filter to determine if the peer device is a previously connected peer device. The aggregate value may represent addressed of previously connected peer devices. The bloom filter may be implemented in conjunction with the BT whitelist.

A wireless station may include one or more processors. The processors may perform operations to determine whether the peer device is a previously connected peer device. The wireless station may receive the connection parameter. The wireless station may also determine the aggregate value of the bloom filter. In addition, the wireless station may receive the connect request from the peer device. The connect request may include the address corresponding to the peer device. Further, the wireless station may map the address to the address value. The wireless station may determine whether the aggregate value corresponds to the address value. Responsive to the aggregate value corresponding to the address value, the wireless station may perform the connection procedure according to a revised procedure using the connection parameter. Alternatively, responsive to the aggregate value not corresponding to the address value, the wireless station may perform the connection procedure according to a new peer device procedure. Further, responsive to the aggregate value not corresponding to the address value, the wireless station may update the aggregate value of the bloom filter based on the address value.

One or more aspect described in the present disclosure may improve one or more KEI metrics by implementing the bloom filter in the controller stack. For example, a user experience may be improved by reducing a connection time, a pairing time, or some combination thereof between the peer device and the wireless station. The aspects described in the present disclosure may reduce pairing time, a connect time, a reconnect time, or some combination thereof between the wireless station and a BT peer device. The aspects described in the present disclosure may reduce an AP reconnect time, a WiFi peer to peer (P2P) connect time, or some combination thereof between the wireless station and a WiFi peer device.

The bloom filter may permit fifty to one hundred addresses to be stored in the bloom filter. Alternatively, the bloom filter may permit one to forty-nine or fifty-one or more addresses to be stored in the bloom filter. The bloom filter may include multiple bits. As a number of the bits of the bloom filter increases, a probability of a false positive identification of a peer device may decrease. For example, during a simulation in which the number of bits of the bloom filter was equal to three hundred bits, a number of hash functions was equal to two, and a number of addresses to be stored was equal to fifty, the probability of a false positive identification of a peer device was equal to ten percent. As another example, during simulations in which the number of bits of the bloom filter was equal to six hundred twenty-five or one thousand bits, the number of hash functions was equal to one; two; or four, and the number of addresses to be stored was equal to fifty or one hundred, the probability of a false positive identification of a peer device was equal to five percent. As yet another example, during a simulation in which the number of bits of the bloom filter was equal to eight hundred forty-eight bits, the number of hash functions was equal to four, and the number of addresses to be stored was equal to one hundred, the probability of a false positive identification of a peer device was equal to two percent. The probability of a false positive identification of a peer device for the simulations was determined according to Equation 5.

$$P = (1 - e^{-\frac{km}{n}})^k \quad \text{Equation 5}$$

In Equation 5, k may represent the number of hash functions, m may represent the number of bits of the bloom filter, and n may represent the number of addresses to be stored.

During other simulations the HCI induced a delay of roughly four hundred milliseconds (ms). Implementing the bloom filter in the controller stack may eliminate or reduce the roughly four hundred ms delay, which may provide a roughly twenty-five percent improvement (e.g., reduction) of the connection time between a BT mouse and a wireless station.

Figure 7:
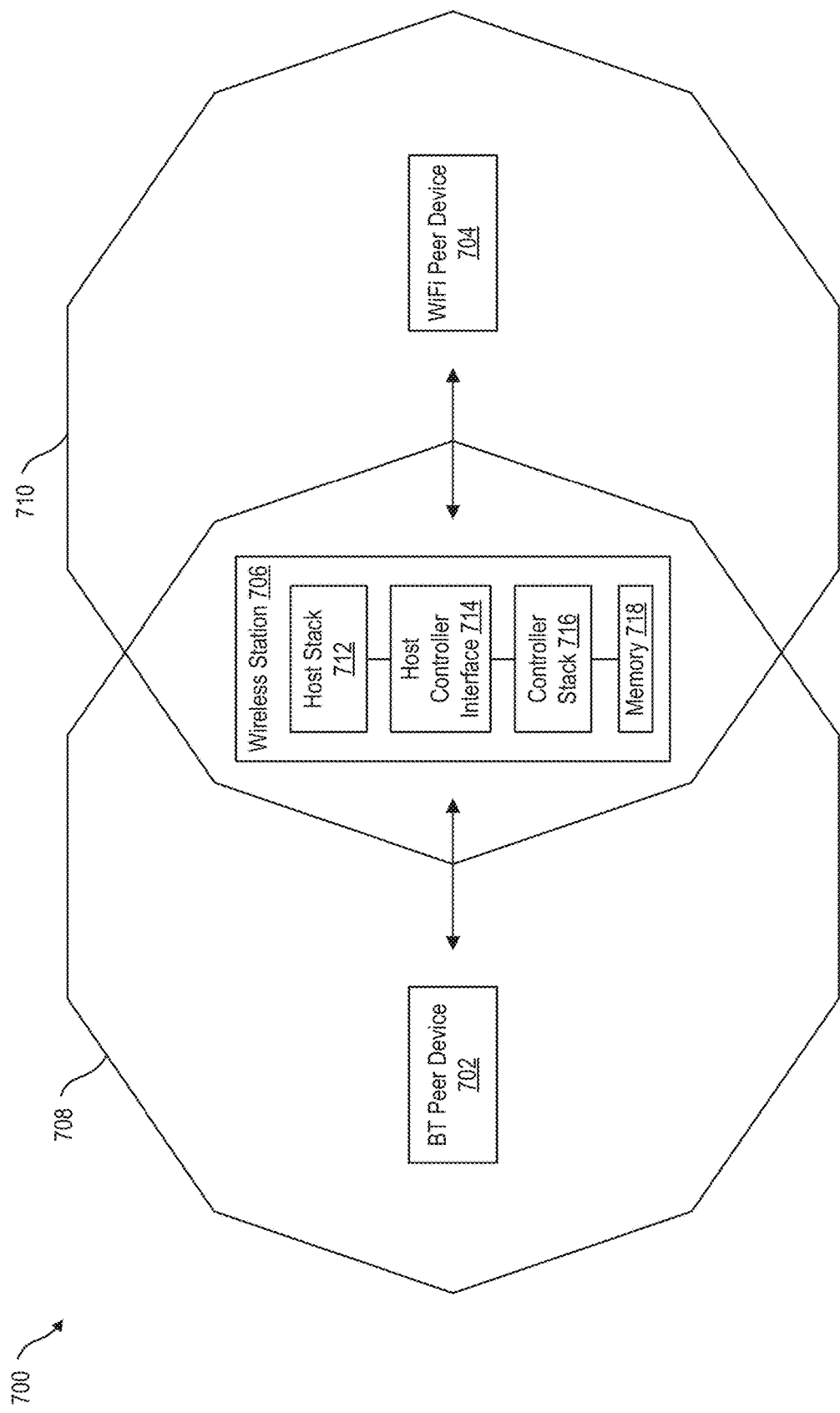
FIG. 7 illustrates a block diagram of an exemplary operational environment for a wireless station.

FIG. 7 illustrates a block diagram of an exemplary operational environment 700 for a wireless station 706, in accordance with at least one aspect described in the present disclosure. The operational environment 700 may include a BT network 708 and a WiFi network 710. The wireless station 706 may operate as a BT AP, a WiFi AP, or some combination thereof. The BT network 708 may correspond to a physical area of coverage provided by the wireless station 706. The WiFi network 710 may correspond to a physical area of coverage provided by the wireless station 706. A portion or all of the physical area corresponding to the WiFi network 710 may overlap a portion of the physical area corresponding to the BT network 708. A BT peer device 702 may be physically located within the physical area of coverage of the BT network 708. In addition, a WiFi peer device 704 may be physically located within the physical area of coverage of the WiFi network 710.

The wireless station 706 may include a host stack 712, a HCI 714, a controller stack 716, and a memory 718. The wireless station 706 may include, or may be implemented, partially or entirely, by circuitry and/or logic. For example, the host stack 712, the HCI 714, the controller stack 716, the memory 718, or some combination thereof may be implemented, partially or entirely, by circuitry and/or logic. Additionally or alternatively, one or more functionalities of the wireless station 706 may be implemented by logic, which may be executed by a machine and/or one or more processors. The memory 718 may be configured to store at least some of the information processed by the wireless station 706. Examples of the wireless station 706 may include, but are not limited to, a smartphone, a laptop computer, a computing device, a tablet computer, a mobile phone, a personal digital assistant (PDA), an e-reader device, a desktop computer, a wearable computing device, or any other appropriate device.

The host stack 712, the HCI 714, and the controller stack 716 may form a split stack architecture. The host stack 712 may be located within an OS (not illustrated in FIG. 7) of the wireless station 706. In addition, the controller stack 716 may be located within a firmware (not illustrated in FIG. 7) of the wireless station 706. The host stack 712, the HCI 714, the controller stack 716, or some combination thereof may form part of a modem (not illustrated in FIG. 7) which may wirelessly couple the wireless station 706 to the BT peer device 702, the WiFi peer device 704, or some combination thereof.

A single instance of the host stack 712, the HCI 714, and the controller stack 716 are illustrated in FIG. 7 for example purposes. The wireless station 706 may include multiple stack arrangements, in which a first host stack is configured for BT communication and a second host stack is configured for WiFi communication. Additionally or alternatively, the wireless station 706 may include two HCIs in which a first HCI is configured for BT communication and a second HCI is configured for WiFi communication. Additionally or alternatively, the wireless station 706 may include two controller stacks in which a first controller stack is configured for BT communication and a second controller stack is configured for WiFi communication.

The controller stack 716 may receive a connection parameter. The controller stack 716 may receive the connection parameter from the host stack 712 via the HCI 714. The connection parameter may include a BT inquiry result. The controller stack 716 may save the connection parameter in the memory 718 as a current connection parameter. The controller stack 716 may periodically receive the connection parameter from the host stack 712 via the HCI 714. The controller stack 716 may save the periodically received connection parameter in the memory 718 to ensure the current connection parameter is updated.

The controller stack 716 may include a bloom filter (not illustrated in FIG. 7). The bloom filter may be stored in the memory 718. Alternatively, the bloom filter may be stored in the controller stack 716. The controller stack 716 may determine an aggregate value of the bloom filter. The aggregate value may include a binary value that corresponds to an address of each peer device that has previously connected to the wireless station 706.

The controller stack 716 may receive a connect request from a peer device. For example, the controller stack 716 may receive the connect request from the BT peer device 702. As another example, the controller stack 716 may receive the connect request from the WiFi peer device 704. Alternatively, the controller stack 716 may receive the connect request from the host stack 712 via the HCI 714. The connect request may include an address corresponding to the peer device (e.g., an address corresponding to the BT peer device 702 or the WiFi peer device 704). The address may include a MAC address corresponding to the peer device. The connect request may include a BT low energy advertisement report.

The controller stack 716 may map the address to an address value. The controller stack 716 may perform a hash function to map the address to the address value. The address value may include a binary value representative of the address. The controller stack 716 may determine whether the aggregate value corresponds to the address value. For example, the controller stack 716 may compare the address value to the aggregate value.

Responsive to the aggregate value corresponding to the address value, the controller stack 716 may perform a connection procedure with the peer device. The controller stack 716 may perform the connection procedure according to a revised procedure using the connection parameter. Alternatively, responsive to the aggregate value not corresponding to the address value, the controller stack 716 may perform the connection procedure according to a new peer device procedure. In addition, responsive to the aggregate value not corresponding to the address value, the controller stack 716 may update the aggregate value in the bloom filter to further correspond to the address of the peer device.

Figure 8:
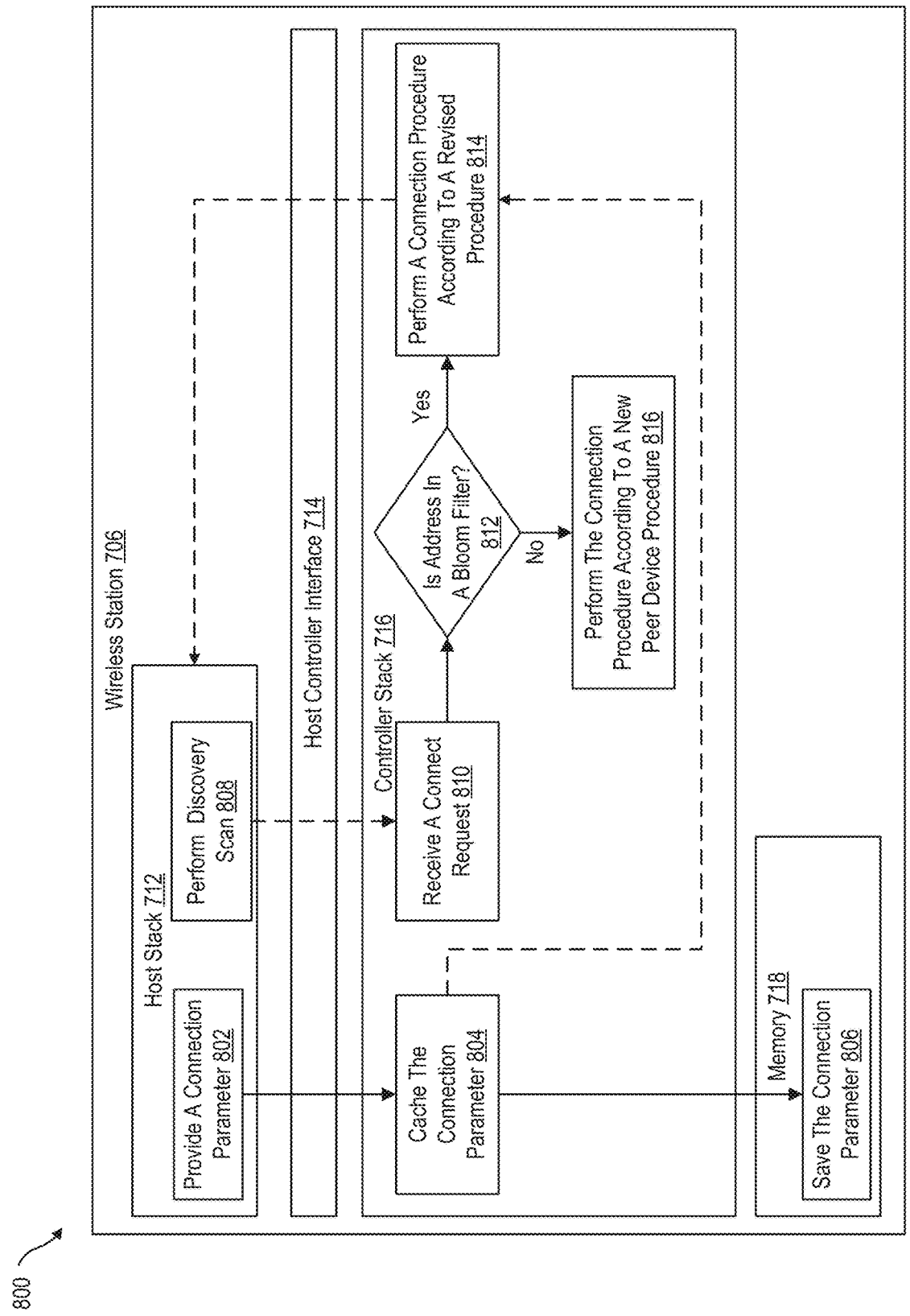
FIG. 8 illustrates a flowchart of an exemplary method that may be performed by the wireless station of FIG. 7.

FIG. 8 illustrates a flowchart of an exemplary method 800 that may be performed by the wireless station 706 of FIG. 7, in accordance with at least one aspect described in the present disclosure. The method 800 may be performed by any suitable system, apparatus, or device with respect to performing a connection procedure. For example, the host stack 712, the HCI 714, the controller stack 716, or some combination thereof of FIG. 7 may perform or direct performance of one or more of the operations associated with the method 800. The method 800 is described in relation to FIG. 8 as being performed by the host stack 712, the HCI 714, and the controller stack 716 for example purposes. The method 800 may include one or more blocks 802, 804, 806, 808, 810, 812, 814, and 816. Although illustrated with discrete blocks, the operations associated with one or more of the blocks of the method 800 may be divided into additional blocks, combined into fewer blocks, or eliminated, depending on the particular implementation.

At block 802, the host stack 712 may provide a connection parameter. The host stack 712 may provide the connection parameter to the controller stack 716 via the HCI 714. At block 804, the controller stack 716 may receive and cache the connection parameter 804. The host stack 712 may periodically provide the connection parameter via the HCI 714. At block 806, the controller stack 716 may save the connection parameter in the memory 718. The connection parameter may be saved as the current connection parameter. The controller stack 716 may save the periodically received connection parameter in the memory 718 to ensure the current connection parameter is updated.

At block 808, the host stack 712 may perform a discovery scan to identify peer devices that are to connect to the wireless station 706. The host stack 712 may detect a peer device that is to connect to the wireless station 706. At block 810, the controller stack 716 may receive a connect request. The controller stack 716 may receive the connect request from the host stack 712 via the HCI 714. Alternatively, the controller stack 716 may receive the connect request directly from peer device that is to connect to the wireless station 706. The connect request may include an address corresponding to the peer device. In addition, the controller stack 716 may map the address to an address value.

At block 812, the controller stack 716 may determine whether the address is in a bloom filter. The controller stack 716 may determine whether the aggregate value of the bloom filter corresponds to the address value corresponding to the peer device. If the address is in the bloom filter, block 812 may be followed by block 814. If the address is not in the bloom filter, block 812 may be followed by block 816.

At block 814, the controller stack 716 may perform a connection procedure according to a revised procedure. The controller stack 716 may perform the connection procedure to wirelessly couple the peer device to the wireless station 706 using the connection parameter. Additionally or alternatively, the controller stack 716 may provide a notice via the HCI 714 to the host stack 712 that the peer device has connected again. At block 816, the controller stack 716 may perform the connection procedure according to a new peer device procedure.

Modifications, additions, or omissions may be made to the method 800 without departing from the scope of the present disclosure. For example, the operations of the method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 9:
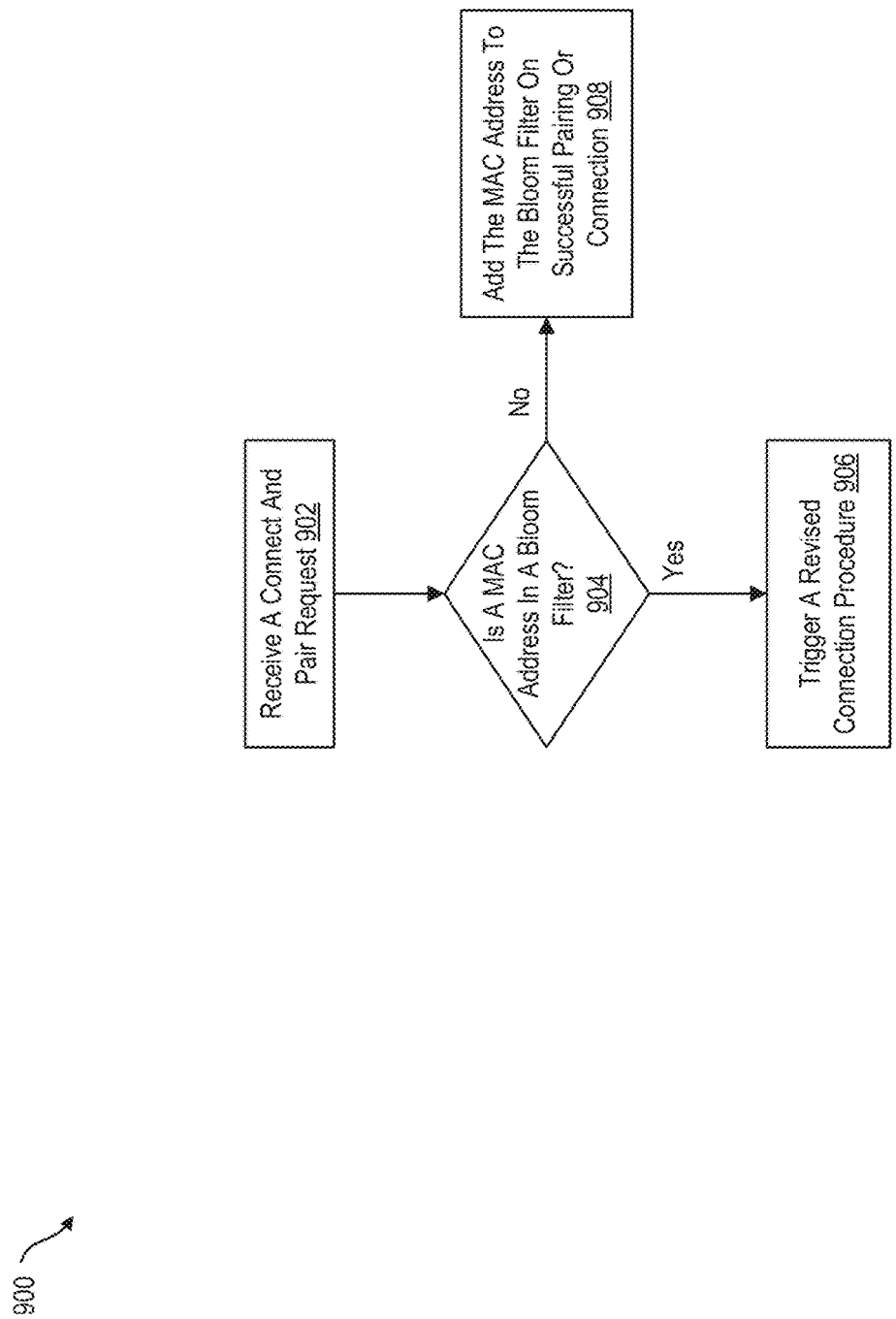
FIG. 9 illustrates a flowchart of any exemplary method to add a MAC address to a bloom filter or trigger a revised connection procedure.

FIG. 9 illustrates a flowchart of any exemplary method 900 to add a MAC address to a bloom filter or trigger a revised connection procedure, in accordance with at least one aspect described in the present disclosure. The method 900 may be performed by any suitable system, apparatus, or device with respect to performing a connection procedure. For example, the controller stack 716 of FIG. 7 may perform or direct performance of one or more of the operations associated with the method 900. The method 900 is described in relation to FIG. 9 as being performed by the controller stack 716 for example purposes. The method 900 may include one or more blocks 902, 904, 906, and 908. Although illustrated with discrete blocks, the operations associated with one or more of the blocks of the method 900 may be divided into additional blocks, combined into fewer blocks, or eliminated, depending on the particular implementation.

At block 902, the controller stack 716 may receive a connect and pair request. The controller stack 716 may receive the connect and pair request from a peer device. The connect and pair request may include an address corresponding to the peer device. The address may include a MAC address corresponding to the peer device. The controller stack 716 may also map the address to an address value. The controller stack 716 may map the address to the address value by performing a hash function configured to map the address to a binary value. For example, each hash function of a k number of hash functions may be applied to the address. The address value may include the binary value that includes a second set of bits. Each bit of the second set of bits may include a high value or a low value based on the address corresponding to the peer device.

At block 904, the controller stack 716 may determine whether the MAC address is in the bloom filter. The controller stack 716 may determine an aggregate value of the bloom filter. The aggregate value may correspond to an address of each peer device that has previously connected to the wireless station 706. The aggregate value may include a binary value including a first set of bits. Each bit of the first set of bits may include the high value or the low value based on the address of each peer device that has previously connected to the wireless station 706. The controller stack 716 may determine whether each corresponding bit of the first set of bits includes the high value. The corresponding bits of the first set of bits may correspond to each bit of the second set of bits that includes the high value. If the MAC address is in the bloom filter, block 904 may be followed by block 906. If the MAC address is not in the bloom filter, block 904 may be followed by block 908.

At block 906, the controller stack 716 may trigger a revised connection procedure. The revised connection procedure may wirelessly connect, either according to BT standards or WiFi standards, the peer device to the wireless station 706. The controller stack 716, responsive to each corresponding bit of the first set of bits including the high value, may identify the peer device as a peer device that has previously connected to the wireless station 706. In addition, the controller stack 716, responsive to the aggregate value corresponding to the address value, may perform the connection procedure according to the revised procedure using the connection parameter.

At block 908, the controller stack 716 may add the MAC address to the bloom filter on successful paring or connection. The controller stack 716 may update the aggregate value in the bloom filter to further correspond to the address of the peer device. For example, the controller stack 716 may set each corresponding bit of the first set of bits to the high value. Adding the MAC address to the bloom filter is discussed in more detail below in relation to FIG. 10.

Modifications, additions, or omissions may be made to the method 900 without departing from the scope of the present disclosure. For example, the operations of the method 900 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 10:
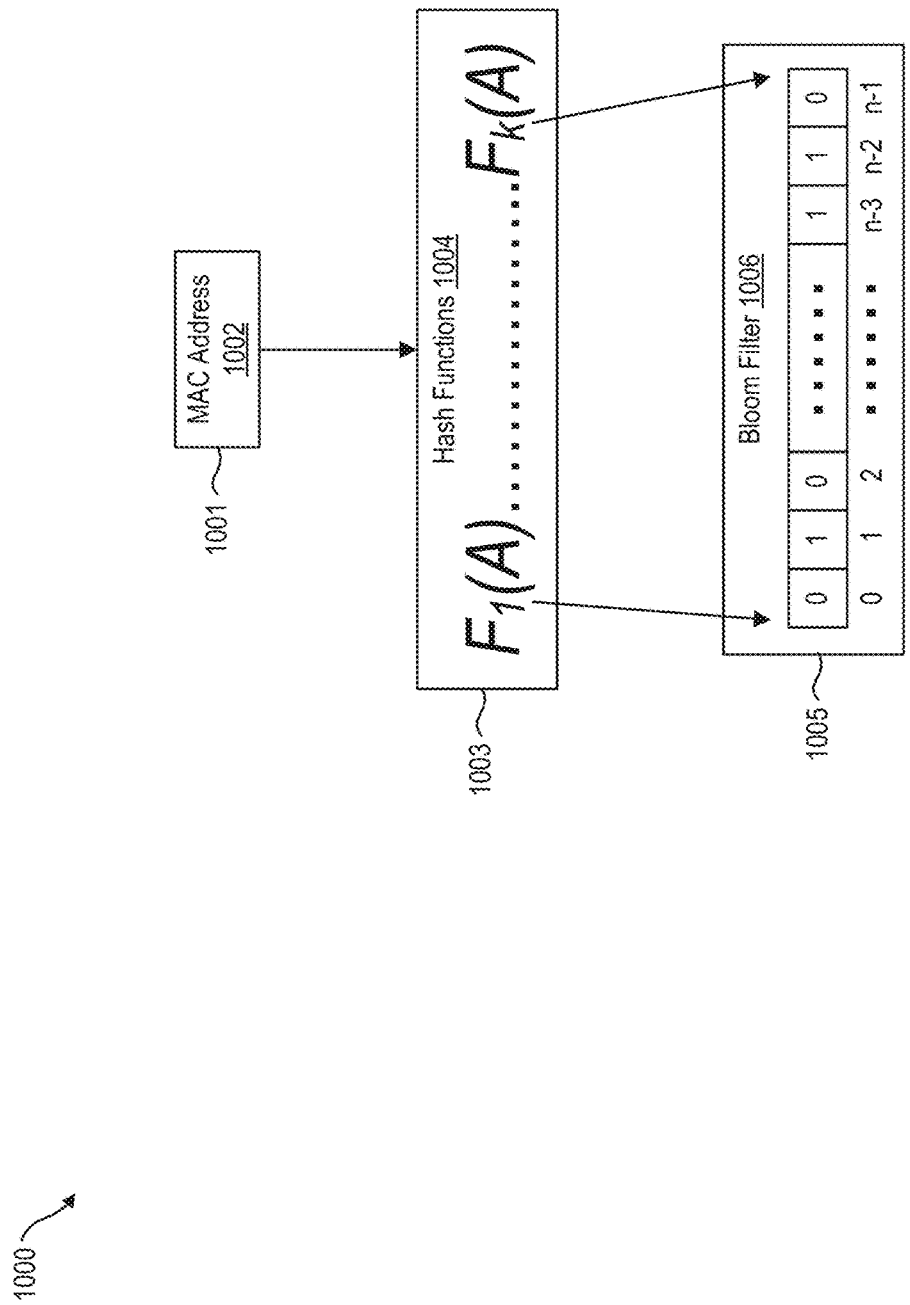
FIG. 10 illustrates a flowchart of an exemplary method to add a MAC address to a bloom filter using hash functions.

FIG. 10 illustrates a flowchart of an exemplary method 1000 to add a MAC address 1002 to a bloom filter 1006 using hash functions 1004, in accordance with at least one aspect described in the present disclosure. The method 1000 may be performed by any suitable system, apparatus, or device with respect to performing a connection procedure. For example, the controller stack 716 of FIG. 7 may perform or direct performance of one or more of the operations associated with the method 1000. The method 1000 is described in relation to FIG. 10 as being performed by the controller stack 716 for example purposes. The method 1000 may include one or more blocks 1001, 1003, and 1005. Although illustrated with discrete blocks, the operations associated with one or more of the blocks of the method 1000 may be divided into additional blocks, combined into fewer blocks, or eliminated, depending on the particular implementation.

At block 1001, the controller stack 716 may receive the MAC address 1002. The MAC address 1002 may correspond to the peer device that is to wirelessly connect to the wireless station 706. At block 1003, the controller stack 716 may apply the hash functions 1004 to the MAC address 1002. The hash functions 1004 may include a k number of hash functions. The controller stack 716 may apply each of the k number of hash functions to the MAC address. The hash functions 1004 may include one multiplication operation per digit of the MAC address. The controller stack 716 may map the MAC address to the address value using the hash functions 1004.

The controller stack 716 applying the hash functions 1004 to the MAC address 1002 may result in the address value. The address value may include the binary value including the second set of bits. Each bit of the second set of bits may include the high value or the low value based on the MAC address 1002 and the hash functions 1004.

At block 1005, the controller stack 716 may set corresponding bits in the bloom filter 1006 to the high value. The high value may correspond to a digital high value (e.g., a value of one) and the low value may correspond to a digital low value (e.g., a value of zero). The controller stack 716 may update the aggregate value in the bloom filter 1006 to further correspond to the address of the peer device. The bloom filter 1006 may include the first set of bits. Each bit of the first set of bits may include the high value or the low value based on the MAC address of each peer device that has previously connected to the wireless station 706.

Modifications, additions, or omissions may be made to the method 1000 without departing from the scope of the present disclosure. For example, the operations of the method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

A wireless station may include a split stack architecture in which communication operations are split between a controller stack (e.g., a firmware) and a host stack (e.g., an OS) of the wireless station. The split stack architecture may perform WiFi operations, BT operations, or some combination thereof. The host stack may be implemented as part of a kernel, a middleware, or some combination thereof of the wireless station. The controller stack may communicate with the host stack via a HCI.

Some aspects described in the present disclosure may build context in the controller stack. The controller stack may identify a peer device that is to connect to the wireless station as a known, a trusted, or a previously connected peer device based on the context. If the controller stack identifies the peer device as a previously connected peer device, the controller stack may perform a revised connection procedure with the peer device using a connection parameter saved in a memory of the controller stack rather than communicating with the host stack via the HCI.

To enable the controller stack as a context aware stack with regard to a peer device, a bloom filter may be implemented in the controller stack. The bloom filter may enable the controller stack to remember between fifty and one hundred peer devices which were previously connected and paired. A number of bits of the bloom filter may be increased to increase the number of peer devices which were previously connected to be stored in the bloom filter. The peer devices may include Wi-Fi direct peer devices, a P2P peer device, or some combination thereof.

The controller stack may implement a hash function to hash MAC addresses corresponding to the peer devices. The hash function may map the MAC addresses of any size to a fixed size (e.g., a fixed number of bits). The hash function may map the MAC addresses to binary values. The MAC addresses may include a WiFi AP MAC address, a WiFi Direct MAC address, or some combination thereof.

The controller stack may periodically receive a connection parameter from the host stack via the HCI. The connection parameter may include a default connection parameter, a preferred connection parameter, a frame data parameter, an authentication payload parameter, a BT profile parameter, a WiFi security parameter, or some combination thereof. The connection parameter may permit the controller stack to proactively respond to connect requests from known peer devices.

When the controller stack receives a connect request (e.g., a BT low energy advertising report or inquiry result is received from a known peer device), the controller stack may perform the connection procedure according to the revised connection procedure.

The bloom filter may include a probabilistic data structure for storing addresses corresponding to peer devices that have previously connected to the wireless station. The controller stack may hash the address included in the connect request. In addition, the controller stack may add the hashed address to the bloom filter. The hash function may include:

```
bloom_filter_hash(seed, prime_h, B, m)
// seed: chosen as per hash function index
// prime-h: a prime number (e.g., a constant)
// B: the six octets MAC address -> {b0, b1, ... , b5}
{
    hash = seed * prime_h
    B' = 0
    for bi in B :
        B' = B' XOR bi
        hash = hash XOR B'
    return hash mod m
}
```

The controller stack may check addresses corresponding to peer devices that are to connect to the wireless station to the bloom filter for context (e.g., the controller stack may proactively perform the connection procedure with a peer device that has previously connected to the wireless station). The controller stack may provide a notification to the host stack via the HCI that a previously connected peer device is connected to the wireless station.

If the wireless station operates according to low energy privacy 1.2 standards, the bloom filter check (e.g., comparison of the address value to the aggregate value) may occur after an identity resolution. If the wireless station operates according to low energy privacy 1.1 standards, the controller stack may update the aggregate value independent of the host stack.

The bloom filter and the controller stack proactively performing the connection procedure without communicating via the HCI may reduce delays induced by the HCI.

The wireless station may include one or more processors. The one or more processors may include a split stack architecture. The split stack architecture may include a host stack, an HCI, and a controller stack. The host stack may be located within an OS of the wireless station. The controller stack may be located within a firmware of the wireless station. The wireless station may also include a memory.

The controller stack may receive a connection parameter from the host stack via the HCI. The controller stack may save the connection parameter in the memory as a current connection parameter. The connection parameter may be periodically received and saved in the memory to ensure the current connection parameter is updated.

The controller stack may determine an aggregate value of a bloom filter. The aggregate value may correspond to an address of each peer device that has previously connected to the wireless station. The aggregate value may include a binary value including a first set of bits. Each bit of the first set of bits may include a high value or a low value based on the address of each peer device that has previously connected to the wireless station.

The controller stack may receive a connect request from a peer device. The connect request may include an address corresponding to the peer device. The address may include a MAC address corresponding to the peer device.

The controller stack may map the address to an address value. The controller stack may map the address to the address value by performing a hash function configured to map the address to a binary value. The hash function may include a hashing algorithm that includes a single multiplication operation per digit of the address. The address value may include a binary value including a second set of bits. Each bit of the second set of bits may include the high value or the low value based on the address corresponding to the peer device.

The controller stack may determine whether the aggregate value corresponds to the address value. The controller stack may determine whether the aggregate value corresponds to the address value by determining whether each corresponding bit of the first set of bits includes the high value. The corresponding bits of the first set of bits may correspond to each bit of the second set of bits that includes the high value.

The controller stack, responsive to the aggregate value corresponding to the address value, may perform a connection procedure according to a revised procedure using the connection parameter. Alternatively, the controller stack, responsive to the aggregate value not corresponding to the address value, may perform the connection procedure according to a new peer device procedure. Further, the controller stack, responsive to the aggregate value not corresponding to the address value, may update the aggregate value in the bloom filter to further correspond to the address of the peer device.

The wireless station may include a BT device, a WiFi device, or some combination thereof.

A wireless station may wirelessly transmit media content according to a media broadcast technique. The media broadcast technique may include a Bluetooth (BT) low energy (LE) broadcast technique. The media content may include audio content, video content, or some combination thereof. The wireless station may wirelessly transmit the media content to a receiver, a border node, or some combination thereof.

The wireless station and the receiver may form a first network implemented within an environment. The border node (e.g., a border device) may be communicatively coupled to a border receiver. The border node and the border receiver may form a second network implemented within the environment. Examples of the receiver and the border receiver may include but are not limited to a hearing aid, a television (TV), a smartphone, a mobile device, a BT speaker, or any other appropriate receiver. Examples of the environment include but are not limited to an airport, a train station, a market, a shopping center, an outdoor area, a bus, a train, a vehicle, a building, or any other appropriate environment.

The media content may be intended to be broadcast to all receivers within the environment (e.g., the receiver and the border receiver) for playback within the environment. The receiver may playback the media content by playing the video content via a display screen, playing the audio content via a speaker, or some combination thereof. The display screen may include a display screen of the receivers, a remote display, or some combination thereof. The speaker may include a speaker of the receivers, a remote speaker, or some combination thereof.

Some broadcast technologies may only broadcast the media content to receivers that are directly coupled to the wireless station within the first network. These broadcast technologies may not broadcast the media content to the border receiver within the second network. Other broadcast technologies may broadcast the media content without synchronization of playback. For example, the receiver may playback the media content according to a first clock and the border receiver may playback the media content according to a second clock that is different than the first clock. These broadcast technologies may not transmit information to synchronize the broadcast, the playback, or some combination thereof of the media content in the second network to the broadcast, the playback, or some combination thereof in first network.

Some broadcast technologies may broadcast the media content including a single version of the audio content. These broadcast technologies may not permit different versions of the audio content to be broadcast within the first network and the second network. Additionally or alternatively, these broadcast technologies may not permit the different versions of the audio content to be included in the playback over the video content (e.g., a common video content) on the receiver and the border receiver. For example, an audio announcement in a first language corresponding to the video content may be received via a microphone communicatively coupled to the wireless station. The audio content may include the audio announcement in the first language and a second language to which the audio announcement was converted.

A wireless station in accordance with at least one aspects described in the present disclosure may broadcast the media content within the first network and to a border node within the second network so as to synchronize the broadcast and playback of the media content. In addition, the wireless station may transmit an advertisement packet to the border node. The advertisement packet may include a protocol data unit (PDU). The PDU may include metadata, clock information, or some combination thereof to synchronize playback of the media content relative to the first clock and the second clock. In addition, the receiver and the border receiver may synchronize playback of the media content based on the metadata. The metadata may include a codec, a media type, media content information, or any other appropriate information. The wireless station may transmit the advertisement packets to the border node according to the BT LE broadcast protocol. The wireless station may transmit subsequent advertisement packets to the border node to maintain synchronization of the broadcast and playback of the media content in the first network and the second network.

The wireless station may include one or more processors. The wireless station may determine a border node of a second network is within communication range of the wireless station. The wireless station may be within a first network that is different than the second network. The wireless station may instruct an initial advertisement packet be provided to the border node. The wireless station may provide the initial advertisement packet according to the BT LE broadcast protocol. The initial advertisement packet may cause the border node to synchronize broadcast of the media content within the second network to broadcast, playback, or some combination thereof of the media content within the first network. The wireless station may periodically instruct subsequent advertisement packets be provided to the border node. The subsequent periodic advertisement packets may maintain synchronization of the broadcast, the playback, or some combination thereof of the media content within the first network and the second network.

The border node (e.g., another wireless station) may detect the wireless station is within communication range. The border node may receive the initial advertisement packet from the wireless station according to the BT LE broadcast protocol. The border node may instruct broadcast of the media content within the second network to be synchronized with broadcast of the media content within the first network based on the initial advertisement packet. The border node may periodically receive subsequent advertisement packets to maintain synchronization of the broadcast of the media content within the first network and the second network.

One or more aspect described in the present disclosure may increase a range of playback of the media content (e.g., from a single network to multiple networks). The aspects described in the present disclosure may permit handover or chaining of the broadcast of the media content. In addition, the aspects described in the present disclosure may reduce latency within the network.

Figure 11:
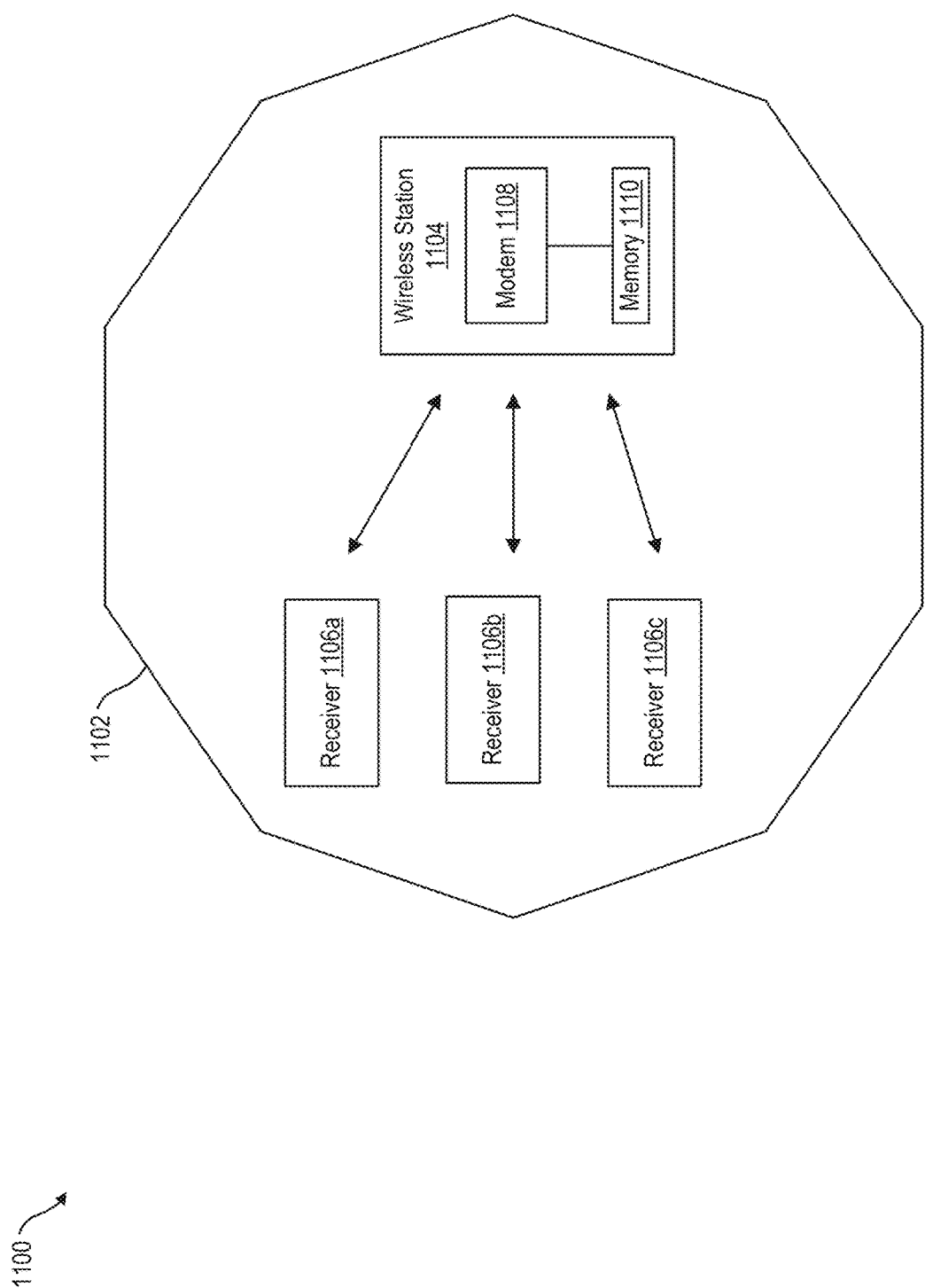
FIG. 11 illustrates a block diagram of an exemplary operational environment for a wireless station.

FIG. 11 illustrates a block diagram of an exemplary operational environment 1100 for a wireless station 1104, in accordance with at least one aspect described in the present disclosure. The operational environment 1100 may include a first network 1102. The wireless station 1104 may operate as an access point (AP). The first network 1102 may correspond to a physical area of coverage provided by the wireless station 1104. One or more receivers 1106a-c (generally referred to in the present disclosure as "receivers 1106") may be physically located within the physical area of coverage of the first network 1102. The receivers 1106 are illustrated in FIG. 11 as including three devices for example purposes. The operational environment 1100 may include any appropriate number of receivers 1106. The receivers 1106 may be communicatively coupled to the wireless station 1104. For example, one or more of the receivers 1106 may be wirelessly coupled to the wireless station 1104. As another example, one or more of the receivers 1106 may be coupled via wiring to the wireless station 1104.

The wireless station 1104 may include a modem 1108 and a memory 1110. The wireless station 1104 may include, or may be implemented, partially or entirely, by circuitry and/or logic. For example, the modem 1108, the memory 1110, or some combination thereof may be implemented, partially or entirely, by circuitry and/or logic. Additionally or alternatively, one or more functionalities of the wireless station 1104 may be implemented by logic, which may be executed by a machine and/or one or more processors. The memory 1110 may be configured to store at least some of the information processed by the wireless station 1104. Examples of the wireless station 1104 may include, but are not limited to, a smartphone, a laptop computer, a computing device, a tablet computer, a mobile phone, a personal digital assistant (PDA), an e-reader device, a desktop computer, a wearable computing device, or any other appropriate device.

The modem 1108 may generate a media signal. The wireless station 1104 may transmit the media signal packet to the receivers 1106. The media signal may include media content for the receivers to playback. The media content may include audio content, media content, or some combination thereof. The receivers 1106 may playback the media content by playing the video content via a display screen (not illustrated in FIG. 11), playing the audio content via a speaker (not illustrated in FIG. 11), or some combination thereof.

Figure 12:
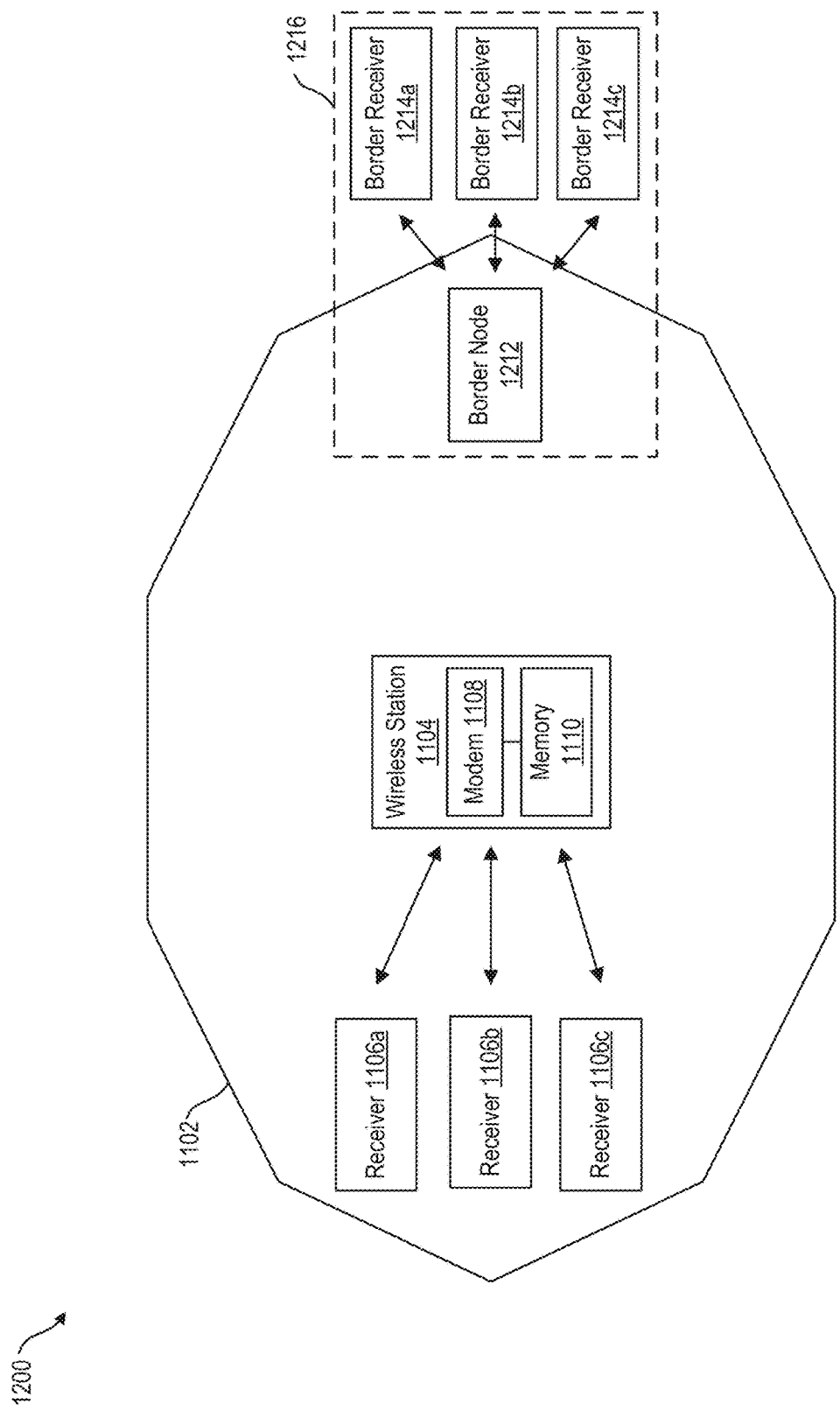
FIG. 12 illustrates a block diagram of another exemplary operational environment for the wireless station.

FIG. 12 illustrates a block diagram of another exemplary operational environment 1200 for the wireless station 1104, in accordance with at least one aspect described in the present disclosure. The operational environment 1200 may include the first network 1102, a second network 1216, and a border node 1212.

The border node 1212 may operate as an AP. The second network 1216 may correspond to a physical area of coverage provided by the border node 1212. One or more border receivers 1214a-c (generally referred to in the present disclosure as "border receivers 1214") may be physically located within the physical area of coverage of the second network 1216. The border receivers 1214 are illustrated in FIG. 12 as including three devices for example purposes. The operational environment 1200 may include any appropriate number of border receivers 1214. The border receivers 1214 may be communicatively coupled to the border node 1212. For example, one or more of the border receivers 1214 may be wirelessly coupled to the border node 1212. As another example, one or more of the border receivers 1214 may be coupled via wiring to the border node 1212.

A portion or all of the physical area corresponding to the second network 1216 may overlap a portion of the physical area corresponding to the first network 1102. The border node 1212 may be physically positioned within the physical area corresponding to the first network 1102.

The border node 1212 may include, or may be implemented, partially or entirely, by circuitry and/or logic. For example, the border node 1212 may be implemented, partially or entirely, by circuitry and/or logic. Additionally or alternatively, one or more functionalities of the border node 1212 may be implemented by logic, which may be executed by a machine and/or one or more processors. The border node 1212 may include a memory (not illustrated in FIG. 12) configured to store at least some of the information processed by the border node 1212. Examples of the border node 1212 may include, but are not limited to, a smartphone, a laptop computer, a computing device, a tablet computer, a mobile phone, a PDA, an e-reader device, a desktop computer, a wearable computing device, or any other appropriate device.

The wireless station 1104 may determine the border node 1212 is within communication range. For example, the wireless station 1104 may determine the border node 1212 is within the physical area corresponding to the first network 1102. As another example, the wireless station 1104 may receive a request signal from the border node 1212 to determine the border node 1212 is within communication range.

The border node 1212 may transmit the request signal. The wireless station 1104 may transmit a response signal in response to the request signal. In addition, the border node 1212 may determine the wireless station 1104 is within communication range based on the response signal.

The wireless station 1104 may provide an initial advertisement packet to the border node 1212. The wireless station 1104 may wirelessly transmit the initial advertisement packet to the border node 1212. The wireless station 1104 may wirelessly transmit the initial advertisement packet according to the BT LE broadcast protocol. The border node 1212 may receive the initial advertisement packet from the wireless station 1104. The initial advertisement packet may cause the border node 1212 to broadcast the media content to the border receivers 1214 within the second network 1216. The media content may include a first audio content to be broadcast within the first network 1102, a second audio content to be broadcast within the second network 1216, and video content to be broadcast within the first network 1102 and the second network 1216. Alternatively, the media content may include an audio content to be broadcast within the first network 1102 and the second network 1216 and video content to be broadcast within the first network 1102 and the second network 1216

The border node 1212 may transmit the media signal to the border receivers 1214. The media signal may correspond to the media content. For example, the border node 1212 may broadcast the media content within the second network 1216 using the media signal based on the initial advertisement packet. In addition, the border node 1212 may synchronize broadcast of the media content within the second network 1216 to broadcast of the media content within the first network 1102. Further, the border node 1212 may synchronize broadcast of the second audio content and the video content within the second network 1216 to the broadcast of the first audio content and the video content within the first network 1104.

The wireless station 1104 may periodically provide subsequent advertisement packets to the border node 1212. The border node 1212 may receive the periodic subsequent advertisement packets. The border node 1212 may maintain synchronization of the broadcast of the media content within the second network 1216 to the broadcast of the media content within the first network 1104 based on the periodic subsequent advertisement packets.

Figure 13:
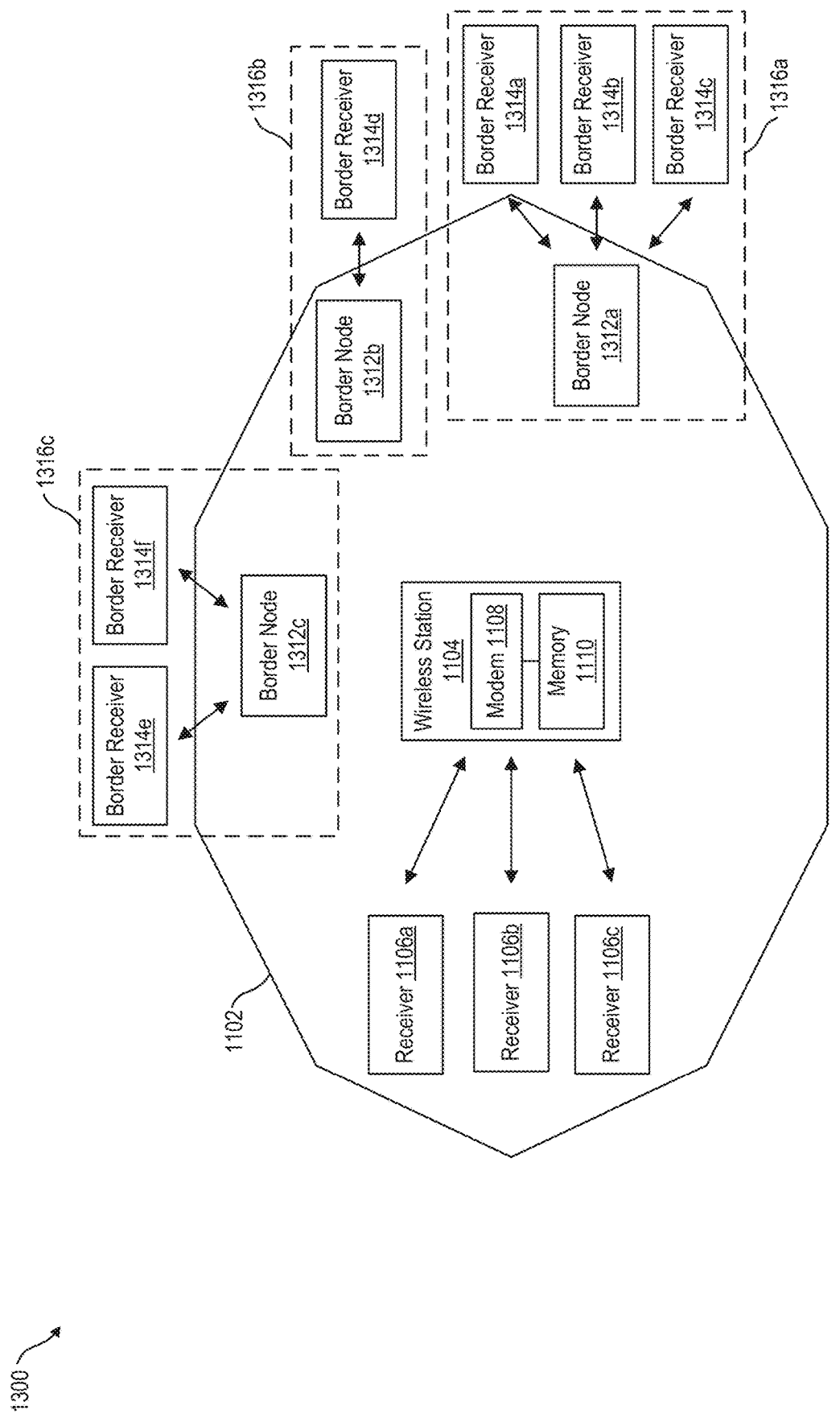
FIG. 13 illustrates a block diagram of yet another exemplary operational environment for the wireless station.

FIG. 13 illustrates a block diagram of yet another exemplary operational environment 1300 for the wireless station 1104, in accordance with at least one aspect described in the present disclosure. The operational environment 1300 may include the first network 1102, a second network 1316a, a third network 1316b, and a fourth network 1316c. In addition, the operational environment 1300 may include a first border node 1312a, a second border node 1312b, and a third border node 1312c. The first border node 1312a, the second border node 1312b, and the third border node 1312c are generally referred to in the present disclosure as "border nodes 1312." The border nodes 1312 may correspond to the border node 1212 of FIG. 12.

The operational environment 1300 may also include border receivers 1314a-f (generally referred to in the present disclosure as "border receivers 1314"). The border receivers 1314 may correspond to the border receivers 1214 of FIG. 12. The second network 1316a, the third network 1316b, and the fourth network 1316c are illustrated as corresponding to various numbers of border receivers 1214 in FIG. 13 for example purposes. The operational environment 1300 may include any appropriate number of border receivers 1314.

The second network 1316a may correspond to a physical area of coverage provided by the first border node 1312a. Three border receivers 1314a-c may be physically located within the physical area of coverage of the second network 1316a. The border receivers 1314a-c within the physical area of coverage provided by the second network 1316a may be communicatively coupled to the first border node 1312a.

The third network 1316b may correspond to a physical area of coverage provided by the second border node 1312b. A border receiver 1314d may be physically located within the physical area of coverage of the third network 1316b. The border receiver 1314d may be communicatively coupled to the second border node 1312b.

The third network 1316b may correspond to a physical area of coverage provided by the third border node 1312b. Two border receivers 1314e-f may be physically located within the physical area of coverage of the third network 1316b. The border receivers 1314e-f within the physical area of coverage provided by the third network 1316b may be communicatively coupled to the third border node 1312c.

A portion or all of the physical area corresponding to the second network 1316a, the third network 1316b, and the fourth network 1316c may overlap a portion of the physical area corresponding to the first network 1102. The border nodes 1312 may be physically positioned within the physical area corresponding to the first network 1102.

The border nodes 1312 may include, or may be implemented, partially or entirely, by circuitry and/or logic. For example, the border nodes 1312 may be implemented, partially or entirely, by circuitry and/or logic. Additionally or alternatively, one or more functionalities of the border nodes 1312 may be implemented by logic, which may be executed by a machine and/or one or more processors. The border nodes 1312 may include a memory (not illustrated in FIG. 13) configured to store at least some of the information processed by the border nodes 1312. Examples of the border nodes 1312 may include, but are not limited to, a smartphone, a laptop computer, a computing device, a tablet computer, a mobile phone, a PDA, an e-reader device, a desktop computer, a wearable computing device, or any other appropriate device.

The wireless station 1104 may determine one or more of the border nodes 1312 are within communication range. For example, the wireless station 1104 may determine the first border node 1312a, the second border node 1312b, the third border node 1312c, or some combination thereof are within the physical area corresponding to the first network 1102. As another example, the wireless station 1104 may receive a request signal from the first border node 1312a, the second border node 1312b, the third border node 1312c, or some combination thereof to determine one or more of the border nodes 1312 are within communication range.

One or more of the border nodes 1312 may transmit the request signal. The wireless station 1104 may transmit a response signal to the first border node 1312a, the second border node 1312b, the third border node 1312c, or some combination thereof in response to the request signal. In addition, the border nodes 1312 may determine the wireless station 1104 is within communication range based on the response signal.

The wireless station 1104 may provide an initial advertisement packet to the border nodes 1312 that are within communication range. The wireless station 1104 may wirelessly transmit the initial advertisement packet to the border nodes 1312. The wireless station 1104 may wirelessly transmit the initial advertisement packet according to the BT LE broadcast protocol. The border nodes 1312 that are within communication range may receive the initial advertisement packet from the wireless station 1104. The initial advertisement packet may cause the border nodes 1312 to broadcast the media content to the corresponding border receivers 1314a-f. For example, the initial advertisement packet may cause the first border node 1312a to broadcast the media content to the border receivers 1314a-c within the physical area of coverage of the second network 1316a. As another example, the initial advertisement packet may cause the second border node 1312b to broadcast the media content to the border receiver 1314d within the physical area of coverage of the third network 1316b. As yet another example, the initial advertisement packet may cause the third border node 1312c to broadcast the media content to the border receivers 1314e-f within the physical area of coverage of the fourth network 1316c.

The media content may include different versions of audio content to be broadcast within the different networks. For example, the media content may include a first audio content to be broadcast within the first network 1102, a second audio content to be broadcast within the second network 1316a, a third audio content to be broadcast within the third network 1316b, and a fourth audio content to be broadcast within the fourth network 1316c and video content to be broadcast within the first network 1102, the second network 1316a, the third network 1316b, and the fourth network 1316c. As another example, the media content may include a first audio content to be broadcast within the first network 1102 and the second network 1316a, a second audio content to be broadcast within the third network 1316b and the fourth network 1316c and video content to be broadcast within the first network 1102, the second network 1316a, the third network 1316b, and the fourth network 1316c. As yet another example, the media content may include audio content to be broadcast within the first network 1102, the second network 1316a, the third network 1316b, and the fourth network 1316c and video content to be broadcast within the first network 1102, the second network 1316a, the third network 1316b, and the fourth network 1316c.

The border nodes 1312 may transmit the media signal to the corresponding border receivers 1314a-f. The media signal may correspond to the media content. For example, the first border node 1312a may broadcast the media content within the second network 1316a using the media signal based on the initial advertisement packet. In addition, the border nodes 1312 may synchronize broadcast of the media content within the second network 1316a, the third network 1316b, and the third network 1316b to broadcast of the media content within the first network 1102.

The wireless station 1104 may periodically provide subsequent advertisement packets to the border nodes 1312. The border nodes 1312 may receive the periodic subsequent advertisement packets. The border node 1312 may maintain synchronization of the broadcast of the media content within the second network 1316a, the third network 1316b, and the fourth network 1316c to the broadcast of the media content within the first network 1104 based on the periodic subsequent advertisement packets.

Figure 14:
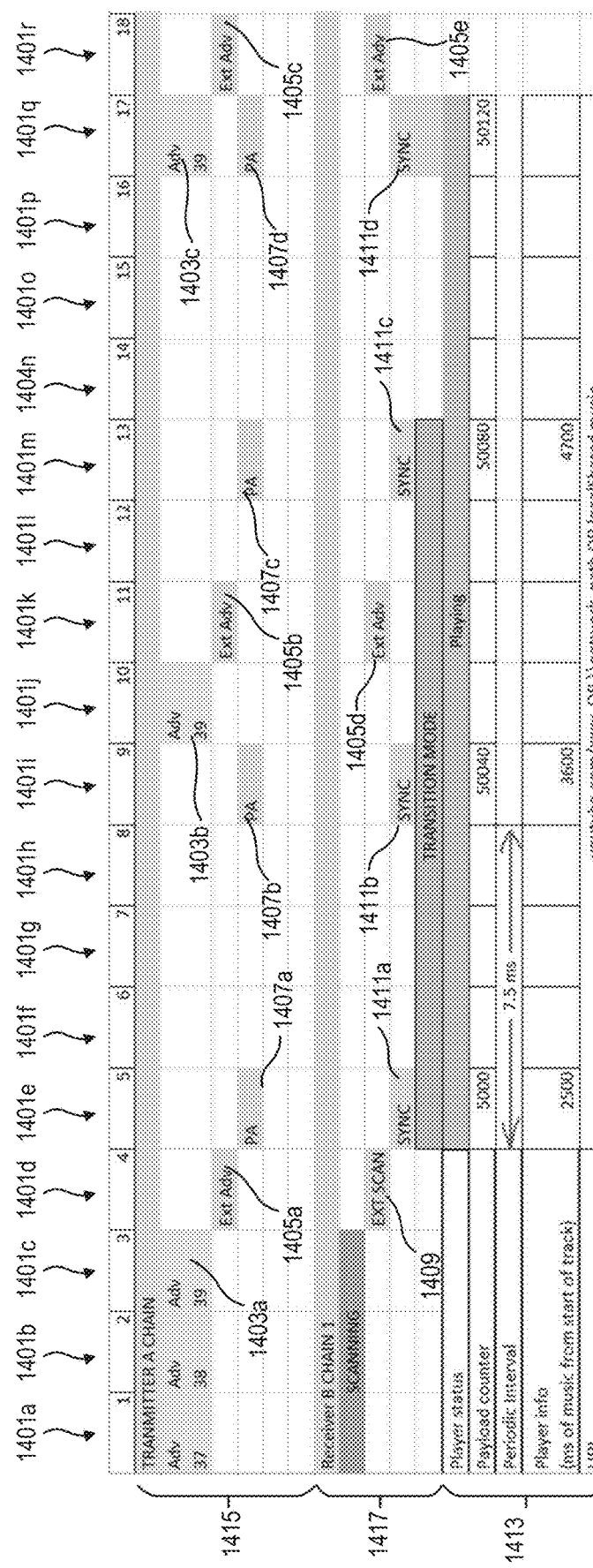
FIG. 14 illustrates a sequence chart of communication frames between the wireless station and a border node.

FIG. 14 illustrates a sequence chart of communication frames 1401a-r between the wireless station 1104 and a border node, in accordance with at least one aspect described in the present disclosure. The border node may include the border node 1212 of FIG. 12, the border nodes 1312 of FIG. 13, or some combination thereof. The communication frames 1401a-r may include a wireless station portion 1415 and a border node portion 1417. The wireless station portion 1415 may include packets and frames generated by the wireless station 1104. The border node portion 1417 may include packets and frames generated by the border node.

The wireless station portion 1415 may include advertisement packets 1403a-c. The advertisement packets 1403b-c are illustrated as including single packets for ease of illustration. The advertisement packets 1403a-c may correspond to basic channels. The advertisement packets 1403a-c may include a PDU 1413 that includes metadata for the border node to synchronize broadcast and playback of the media content within a corresponding network to broadcast and playback of the media content within the first network 1102. The PDU 1413 may include information related to a media handover support, a codec of the media content, a clock setting of the wireless station 1104, support in subsequent payloads for clock synchronization, support in subsequent payloads for player position of the media content, a current timing of the media content within the first network, advertisement periods of time, a media path (e.g., a cloud universal resource locator (URL) or a local URL), a payload counter, an encryption information, a name corresponding to the media content, or some combination thereof.

The PDU 1413 may include information such as whether the media content is playing or paused, a payload counter at a corresponding anchor point, or some combination thereof. An example of the anchor point may include a 7.5 millisecond period of time. The border node may determine which packet to start counting from. The border node may maintain an internal counter from the synchronized frame packets on.

The wireless station portion 1415 may include periodic announcement (PA) packets 1407*a-d*. The PA packet 1407*a* may correspond to the initial advertisement packet and the PA packets 1407*b-d* may correspond to the subsequent advertisement packets. The wireless station 1104 may transmit the PA packets 1407*a-d* to the border node. The border node portion 1417 may include synchronized frame packets 1411*a-d*. The border node may receive the PA packets 1407*a-d* and may generate the synchronized frame packets 1411*a-d* based on and synchronized to the PA packets 1407*a-d*.

The wireless station portion 1415 and the border node portion 1417 may also include extended advertisement packets 1405*a-d*. The border node portion 1417 may include a Bluetooth protocol defined extended advertisement packet, which may provide timing information to synchronize to the PA packets 1407*a-d*.

Border receivers corresponding to the border node portion 1417 may identify data portions of the advertisement packets 1403*a-c*, extended data portions in the extended advertisement packets 1405*a-c*, or some combination thereof. The border receivers may determine whether the border node, the wireless station, or some combination thereof supports broadcast offloading.

The border receivers may detect the communication frames 1401*a-r* at any given time by scanning or extended scanning using a radio within the border receiver to determine if the communication frames 1401*a-r* or other communication frames are available.

Figure 15:
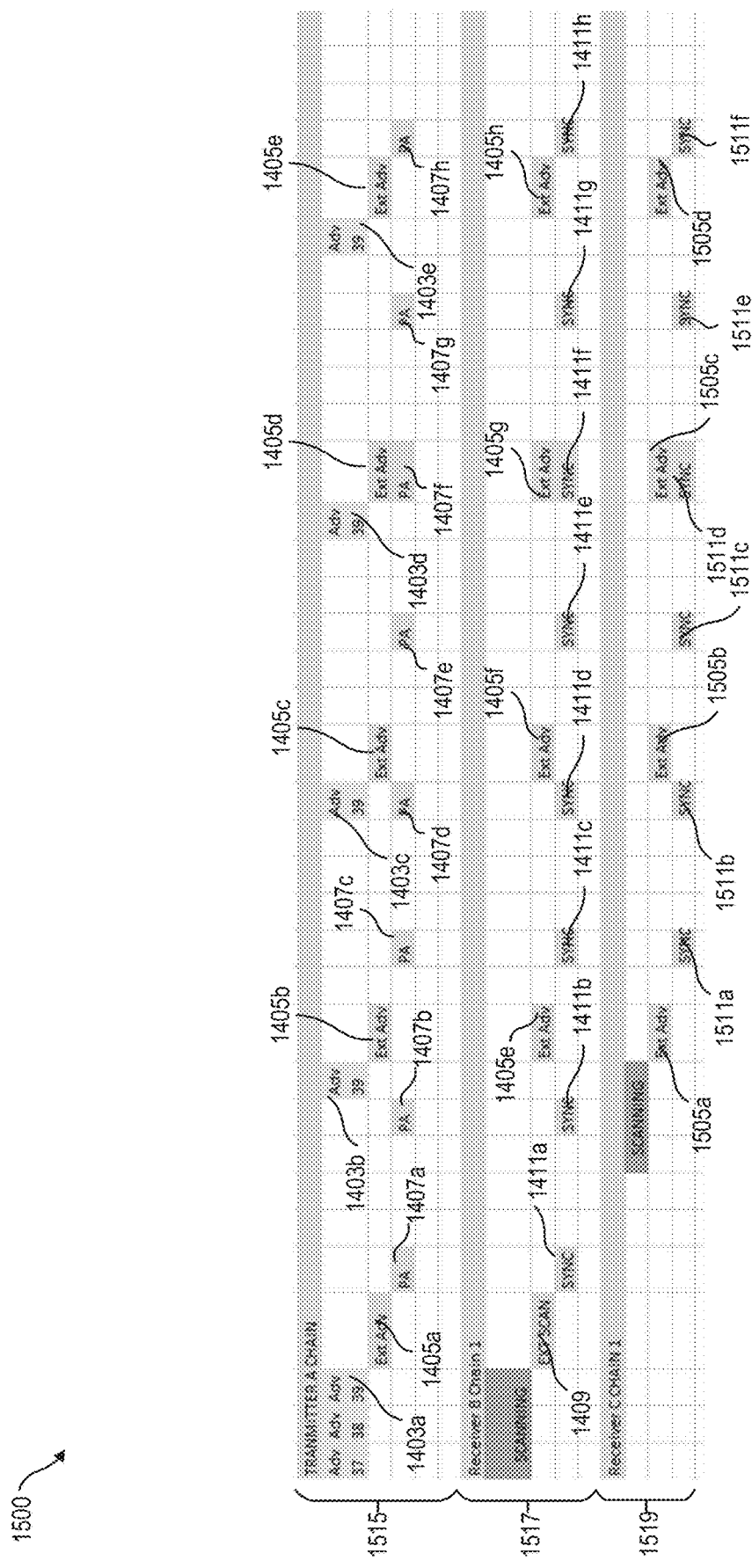
FIG. 15 illustrates a sequence chart of communication frames between the wireless station and multiple border nodes, all according to at least one aspect described in the present disclosure.

FIG. 15 illustrates a sequence chart of communication frames 1500 between the wireless station 1104 and multiple border nodes, in accordance with at least one aspect described in the present disclosure. Individual communication frames are not numbered in FIG. 15 for ease of illustration.

The border nodes may include the border node 1212 of FIG. 12, the border nodes 1312 of FIG. 13, or some combination thereof. The communication frames may include a wireless station portion 1515, a first border node portion 1517, and a second border node portion 1519. The wireless station portion 1515 may include packets and frames generated by the wireless station 1104. The first border node portion 1517 may include packets and frames generated by a first border node. The second border node portion 1519 may include packets and frames generated by a second border node.

The wireless station portion 1515 may include the advertisement packets 1403*a-e*. The advertisement packets 1403*b-e* are illustrated as including single packets for ease of illustration. The advertisement packets 1403*a-e* may correspond to basic channels. The advertisement packets 1403*a-e* may include the PDU (not illustrated in FIG. 15) that includes metadata for the border nodes to synchronize broadcast and playback of the media content within corresponding networks to broadcast and playback of the media content within the first network 1102. The PDU may correspond to the PDU 1413 of FIG. 14.

The wireless station portion 1515 may include the PA packets 1407*a-h*. The PA packet 1407*a* may correspond to the initial advertisement packet and the PA packets 1407*b-h* may correspond to the subsequent advertisement packets. The wireless station 1104 may transmit the PA packets 1407*a-h* to the border nodes. The first border node portion 1517 may include synchronized frame packets 1411*a-h*. The first border node may receive the PA packets 1407*a-h* and may generate the synchronized frame packets 1411*a-h* based on and synchronized to the PA packets 1407*a-h*.

The second border node portion 1519 may include synchronized frame packets 1511*a-f*. The second border node may receive the PA packets 1407*c-h* and may generate the synchronized frame packets 1511*a-f* based on and synchronized to the PA packets 1407*c-h*.

The wireless station portion 1515 and the first border node portion 1517 may also include the extended advertisement packets 1405*a-d*. The second border node portion 1519 may include extended advertisement packets 1505*1-d*. The first border node portion 1517 may include a Bluetooth protocol defined extended advertisement packet, which may provide timing information to synchronize to the PA packets 1407*a-h*.

Border receivers corresponding to the first border node portion 1517 may identify data portions of the advertisement packets 1403*a-e*, extended data portions in the extended advertisement packets 1405*a-h*, or some combination thereof. The border receivers may determine whether the border node, the wireless station, or some combination thereof supports broadcast offloading.

The border receivers may detect the communication frames at any given time by scanning or extended scanning using a radio within the border receiver to determine if the communication frames or other communication frames are available.

A wireless station may wirelessly transmit media content according to a media broadcast technique. The media broadcast technique may include a BT LE broadcast technique. The media content may include audio content, video content, or some combination thereof. The wireless station may wirelessly transmit the media content to a receiver, a border node, or some combination thereof.

A wireless station in accordance with at least one aspects described in the present disclosure may broadcast the media content within the first network and to a border node within the second network so as to synchronize the broadcast and playback of the media content. In addition, the wireless station may transmit an advertisement packet to the border node. The advertisement packet may include a protocol data unit (PDU). The PDU may include metadata, clock information, or some combination thereof to synchronize playback of the media content relative to the first clock and the second clock. In addition, the receiver and the border receiver may synchronize playback of the media content based on the metadata. The metadata may include a codec, a media type, media content information, or any other appropriate information. The wireless station may transmit the advertisement packets to the border node according to the BT LE broadcast protocol. The wireless station may transmit subsequent advertisement packets to the border node to maintain synchronization of the broadcast and playback of the media content in the first network and the second network.

The wireless station and the border node may include software integration changes for handover between networks. The wireless station may play audio content within the first network. The border node may be within communication range of the wireless station. The border node may bridge broadcast of the media content. The wireless station may provide the media content and related information to the border node as part of PAs.

The PAs may include a PDU that includes a media handover support bit, a codec details that indicates codecs that are supported for broadcast, support in subsequent payloads for clock synchronization, support in subsequent payloads for player position of a media packet, a media path, a payload counter, an interval counter, an encryption setting, or some combination thereof.

The media handover support bit may indicate whether the border node supports handover by the wireless station. The codec details may indicate codec and other metadata to be configured by the border node. The support in subsequent payloads for clock synchronization may include clock info every 7.5 ms using to indicate a transition period during handover. The support in subsequent payloads for player position of the media packet may indicate a play position from a player (e.g., in milliseconds) from start of the media content. The media payload may indicate a media URL, a name of the media (a cloud URL if the media needs to be played from cloud). The payload counter, the interval counter, or some combination thereof may indicate a last counter of the payload that is transmitted by the wireless station.

The wireless station may include one or more processors. The wireless station may determine the border node of the second network is within communication range of the wireless station. The wireless station may be within a first network that is different than the second network. The wireless station may detect the border node is within communication range by receiving a request signal from the border node. The wireless station may scan corresponding frequencies after an autonomous period of time for the request signal.

The wireless station may instruct an initial advertisement packet be provided to the border node according to a BT LE broadcast protocol. The initial advertisement packet may cause the border node to synchronize broadcast of media content within the second network to broadcast of the media content within the first network. The initial advertisement packet may cause the border node to broadcast the media content to a receiver of the second network. The media content may include audio content. For example, the media content may include a first audio content to be broadcast within the first network, a second audio content to be broadcast within the second network, and video content to be broadcast within the first network and the second network.

The initial advertisement packet may include the PDU that causes the border node to synchronize the broadcast of the media content within the second network to the broadcast of the media content within the first network. The initial advertisement packet may indicate a codec of the media content, a clock setting of the wireless station, a current timing of the media content within the first network, adver-tisement periods of time, and a name corresponding to the media content. The border receiver, the receiver, or some combination thereof may use internal clocks after receiving an advertisement packet. The current timing of the media content may include a current media packet position corresponding to the media content. The name corresponding to the media content may include a URL corresponding to the media content.

The wireless station may periodically instruct subsequent advertisement packets be provided to the border node. The subsequent periodic advertisement packets may maintain synchronization of the broadcast of the media content within the first network and the second network. The subsequent advertisement packets may indicate a codec, a streaming parameter of the media content (e.g., preferred streaming parameters), a clock setting of the wireless station, an updated timing of the media content within the first network, updated advertisement periods of time, a name corresponding to the media content, or some combination thereof.

The wireless station may transmit a media signal corresponding to the media content to a receiver of the first network. The wireless station may handover control of the broadcast to the border node. The wireless station, after performing the handover, may stop broadcasting the media content.

The receivers (e.g., the receiver, the border receiver, or some combination thereof) may apply corrections in case of loss of packet due to radio communication constraints, based on a counter, a clock, and other parameters, per a received PDU. The receivers may apply packet loss concealment techniques (e.g., packet loss concealment (PLC)) as the PDU may be tracked by looking at the PDU header. If the border node misses a received packet (e.g., one or more packets are missed or corrupted (e.g., a packet may not include a header)), the border node, the receivers, or some combination thereof may determine a packet loss scenario has occurred and may apply corrections.

The border node (e.g., another wireless station) may include one or more processors. The border node may detect a wireless station (e.g., a border node of a first network) is within communication range of the border node. The wireless station may be within a first network that is different than the second network. The border node may detect the wireless station is within communication range by instructing a request signal be provided and/or receiving a response signal from the wireless station in response to the request signal. The border node may scan corresponding frequencies after an autonomous period of time for the request signal.

The border node may receive an initial advertisement packet from the wireless station according to the BT LE broadcast protocol. The initial advertisement packet may cause the border node to broadcast the media content to the border receiver of the second network. The initial advertisement packet may include the PDU. The border node may synchronize the broadcast of the media content within the second network to the broadcast of the media content within the first network based on the PDU.

The PDU may include local clock information of the wireless station, a media type, a media payload, a codec information, and other parameters to synchronize the media content. The initial advertisement packet may indicate a codec of the media content, a codec parameter, a clock setting of the border node, a current timing of the media content within the first network, advertisement periods of time, a name corresponding to the media content, or some combination thereof.

The current timing of the media content may include a current media packet position corresponding to the media content. The name corresponding to the media content may include a URL corresponding to the media content. The clock setting of the wireless station may include local clock information of the wireless station, a broadcasted packet counter incremented for a broadcasted data packet to synchronize with the receiver, or some combination thereof.

The border node may instruct broadcast of media content within the second network to be synchronized with broadcast of the media content within the first network based on the initial advertisement packet. The media content may include audio content, video content, or some combination thereof. The media content may include a first audio content to be broadcast within the first network, a second audio content to be broadcast within the second network, and video content to be broadcast within the first network and the second network.

The border node may periodically receive subsequent advertisement packets to maintain synchronization of the broadcast of the media content within the first network and the second network. The subsequent advertisement packets may indicate a codec of the media content, a clock setting of the wireless station, an updated timing of the media content within the first network, updated advertisement periods of time, a name corresponding to the media content, or some combination thereof.

The receiver may apply corrections in case of loss of packet due to radio communication constraints, based on a counter, a clock, and other parameters, per a received PDU. The receivers may apply packet loss concealment techniques as the PDU is tracked by looking at the PDU headers. If the border node misses a received packet (e.g., one or more packets are missed or corrupted (e.g., a packet may not include a header)), the border node, the receivers, or some combination thereof may determine a packet loss scenario has occurred and may apply corrections. The border node may autonomously determine whether a broadcaster that includes handover support is present by opening a periodic scanner to receive the PDU.

Example 1a may include a wireless station including one or more processors configured to: receive a no WiFi signal indicating a parameter; provide a scan signal including a scan list indicating a WiFi frequency band that a cellular modem is to scan for a WiFi signal based on the parameter; provide a mode signal based on the no WiFi signal, the mode signal indicating that a WiFi modem is to enter a low power mode; receive a detect signal indicating that the cellular modem detected the WiFi signal within the WiFi frequency band; and provide a wake-up signal configured to cause the WiFi modem to enter an operational mode, the wake-up signal indicating a frequency of the detected WiFi signal.

Example 2a may include the wireless station of example 1a, wherein: the one or more processors are further configured to compare a center frequency of the detected WiFi signal to a pre-identified center frequency; and responsive to the center frequency of the detected WiFi signal being the same as the center frequency of the pre-identified center frequency, the wake-up signal further indicates that the detected WiFi signal corresponds to a particular access point.

Example 3a may include the wireless station of any of examples 1a and 2a, wherein: the scan list further indicates one or more cellular frequencies that the cellular modem is to scan for one or more cellular signals; and the one or more processors are further configured to update the scan list to include the WiFi frequency band in addition to the one or more cellular signals based on no WiFi signal.

Example 4a may include the wireless station of any of examples 1a-3a, wherein the no WiFi signal is received after a detection period of time elapses in which the WiFi modem does not detect the WiFi signal.

Example 5a may include the wireless station of any of examples 1a-4a, wherein the parameter includes at least one of a center frequency of a frequency channel, a BW of the frequency channel, subcarrier spacing, a pilot channel frequency of the frequency channel, a sampling frequency of the frequency channel, and a measurement interval.

Example 6a may include the wireless station of any of examples 1a-5a, wherein the WiFi frequency band includes a frequency channel including a twenty-two MHz BW.

Example 7a may include the wireless station of any of examples 1a-5a, wherein the WiFi frequency band includes a plurality of non-overlapping frequency channels.

Example 8a may include the wireless station of any of examples 1a-7a, wherein the WiFi frequency band includes an unlicensed frequency band.

Example 9a may include the wireless station of any of examples 1a-8a, wherein the WiFi frequency band is equal to or between a two GHz band (2.4-2.4853 GHz), a five GHz band (5.725-5.85 GHz), and a WiFi6 band (5.925 GHz to 7.125 GHz) or any other WiFi frequency band supported in future.

Example 10a may include the wireless station of any of examples 1a-9a, wherein the detect signal indicates that the cellular modem detected a total signal power within the WiFi frequency band that is equal to or greater than a threshold value.

Example 11a may include the wireless station of example 10a, wherein the threshold value is equal to or greater than negative seventy dBm.

Example 12a may include the wireless station of any of examples 10a and 11a, wherein the detect signal further indicates that a WiFi pilot channel within the WiFi frequency band was also detected.

Example 13a may include the wireless station of example 10a, wherein the total signal power within the WiFi frequency band is detected by the cellular modem without synchronizing with a corresponding WiFi access point.

Example 14a may include the wireless station of any of examples 1a-13a, further including the WiFi modem, the one or more processors configured to: receive the no WiFi signal from the WiFi modem; provide the mode signal to the WiFi modem; and provide the wake-up signal to the WiFi modem.

Example 15a may include the wireless station of any of examples 1a-14a, further including the cellular modem, the one or more processors configured to: provide the scan signal to the cellular modem; receive the detect signal from the cellular modem.

Example 16a may include a wireless station including a cellular modem including one or more processors, the one or more processors configured to: receive a scan signal including a scan list indicating a WiFi frequency band to scan for a WiFi signal; scan the WiFi frequency band for the WiFi signal; determine a total signal power of the WiFi frequency band based on the scan; and provide a detect signal indicating that the total signal power exceeded a threshold value, the detect signal configured to cause the control device to provide a wake-up signal configured to cause a WiFi modem to enter an operational mode.

Example 17a the wireless station of example 16a, wherein: the one or more processors are further configured to compare a center frequency of the WiFi frequency band to a pre-identified center frequency; and responsive to the center frequency of the WiFi frequency band being the same as the center frequency of the pre-identified center frequency, the detect signal further indicates that the WiFi frequency band corresponds to a particular access point.

Example 18a may include the wireless station of any of examples 16a or 17a, wherein the scan list further indicates one or more cellular frequencies to scan for one or more cellular signals.

Example 19a may include the wireless station of any of examples 16a-18a, wherein the scan list further includes at least one of a center frequency of a frequency channel, a BW of the frequency channel, subcarrier spacing, a pilot channel frequency of the frequency channel, a sampling frequency of the frequency channel, and a measurement interval.

Example 20a may include the wireless station of any of examples 16a-19a, wherein the WiFi frequency band includes a plurality of non-overlapping frequency channels.

Example 21a may include the wireless station of any of examples 16a-20a, wherein the WiFi frequency band includes an unlicensed frequency band.

Example 22a may include the wireless station of any of examples 16a-21a, wherein the threshold value is equal to or greater than negative seventy dBm.

Example 23a may include the wireless station of any of examples 16a-22a, wherein: the one or more processors are further configured to measure a total signal power of a pilot channel within the WiFi frequency band; and responsive to the total signal power of the pilot channel exceeding a pilot threshold value, the detect signal further indicates that the pilot channel was also detected.

Example 24a may include the wireless station of any of examples 16a-23a, wherein the total signal power within the WiFi frequency band is detected without synchronizing with a corresponding WiFi access point.

Example 25a may include the wireless station of any of examples 16a-24a, further including a control device and the WiFi modem, the one or more processors are configured to: receive the scan signal from the control device; and provide the detect signal to the control device.

Example 1b may include a wireless station including one or more processors configured to: receive a connection parameter; determine an aggregate value of a bloom filter; receive a connect request from a peer device, the connect request including an address corresponding to the peer device; map the address to an address value; determine whether the aggregate value corresponds to the address value; and responsive to the aggregate value corresponding to the address value, perform a connection procedure according to a revised procedure using the connection parameter.

Example 2b may include the wireless station of example 1b, wherein responsive to the aggregate value not corresponding to the address value, the one or more processors are further configured to perform the connection procedure according to a new peer device procedure.

Example 3b may include the wireless station of any of examples 1b and 2b, wherein the aggregate value corresponds to an address of each peer device that has previously connected to the wireless station.

Example 4b may include the wireless station of any of examples 1b-3b, wherein the aggregate value includes a binary value including a first plurality of bits, each bit of the first plurality of bits includes a high value or a low value based on the address of each peer device that has previously connected to the wireless station.

Example 5b may include the wireless station of any of examples 1b-4b, wherein the address value includes a binary value including a second plurality of bits, each bit of the second plurality of bits includes a high value or a low value based on the address corresponding to the peer device.

Example 6b may include the wireless station of example 5b, wherein: the one or more processors are configured to determine whether the aggregate value corresponds to the address value by determining whether each corresponding bit of the first plurality of bits includes the high value, wherein the corresponding bits of the first plurality of bits correspond to each bit of the second plurality of bits that includes the high value; and responsive to each corresponding bit of the first plurality of bits including the high value, the one or more processors are further configured to identify the peer device as a peer device that has previously connected to the wireless station.

Example 7b may include the wireless station of any of examples 1b-6b, wherein the one or more processors are configured to map the address to an address value by performing a hash function configured to map the address to a binary value.

Example 8b may include the wireless station of example 7b, wherein the hash function includes a hashing algorithm including a single multiplication operation per digit of the address.

Example 9b may include the wireless station of any of examples 1b-8b, wherein responsive to the aggregate value not corresponding to the address value, the one or more processors are further configured to update the aggregate value in the bloom filter to further correspond to the address of the peer device.

Example 10b may include the wireless station of any of examples 1b-9b, wherein: the wireless station further includes a memory; the one or more processors are further configured to save the connection parameter in the memory as a current connection parameter; and the connection parameter is periodically received and saved in the memory to ensure the current connection parameter is updated.

Example 11b may include the wireless station of any of examples 1b-10b, wherein the address includes a MAC address corresponding to the peer device.

Example 12b may include the wireless station of any of examples 1b-11b, wherein the one or more processors include a split stack architecture including: a host stack located within an operating system of the wireless station; and a controller stack located within a firmware of the wireless station.

Example 13b may include the wireless station of any of examples 1b-12b, wherein the one or more processors are configured to receive the connection parameter from a host stack via a host controller interface.

Example 14b may include the wireless station of any of examples 1b-13b, wherein the wireless station is configured as a Bluetooth device.

Example 15b may include the wireless station of any of examples 1b-14b, wherein the wireless station is configured as a WiFi device.

Example 16b may include a wireless station including one or more processors configured to: receive a connection parameter; determine an aggregate value of a bloom filter; receive a connect request from a peer device, the connect request including an address corresponding to the peer device; map the address to an address value; determine whether the aggregate value corresponds to the address value; and responsive to the aggregate value not corresponding to the address value, perform a connection procedure according to a new peer device procedure.

Example 17b may include the wireless station of example 16b, wherein responsive to the aggregate value corresponding to the address value, the one or more processors are further configured to perform the connection procedure according to a revised procedure using the connection parameter.

Example 18b may include the wireless station of any of examples 16b and 17b, wherein the aggregate value corresponds to an address of each peer device that has previously connected to the wireless station.

Example 19b may include the wireless station of any of examples 16b-18b, wherein the aggregate value includes a binary value including a first plurality of bits, each bit of the first plurality of bits includes a high value or a low value based on the address of each peer device that has previously connected to the wireless station.

Example 20b may include the wireless station of any of examples 16b-19b, wherein the address value includes a binary value including a second plurality of bits, each bit of the second plurality of bits includes a high value or a low value based on the address corresponding to the peer device.

Example 21b may include the wireless station of example 20b, wherein: the one or more processors are configured to determine whether the aggregate value corresponds to the address value by determining whether each corresponding bit of the first plurality of bits includes the high value, wherein the corresponding bits of the first plurality of bits correspond to each bit of the second plurality of bits that includes the high value; and responsive to each corresponding bit of the first plurality of bits including the high value, the one or more processors are further configured to identify the peer device as a peer device that has previously connected to the wireless station.

Example 22b may include the wireless station of any of examples 16b-21b, wherein the one or more processors are configured to map the address to an address value by performing a hash function configured to map the address to a binary value.

Example 23b may include the wireless station of example 22b, wherein the hash function includes a hashing algorithm including a single multiplication operation per digit of the address.

Example 24b may include the wireless station of any of examples 16b-23b, wherein responsive to the aggregate value not corresponding to the address value, the one or more processors are further configured to update the aggregate value in the bloom filter to further correspond to the address of the peer device.

Example 1c may include a wireless station including one or more processors configured to: determine a border node of a second network is within communication range of the wireless station and the wireless station is within a first network that is different than the second network; instruct an initial advertisement packet be provided to the border node according to a Bluetooth low energy broadcast protocol, the initial advertisement packet being configured to cause the border node to synchronize broadcast of media content within the second network to broadcast of the media content within the first network; and periodically instruct subsequent advertisement packets be provided to the border node, the subsequent periodic advertisement packets configured to maintain synchronization of the broadcast of the media content within the first network and the second network.

Example 2c may include the wireless station of example 1c, wherein the initial advertisement packet is configured to cause the border node to broadcast the media content to a receiver of the second network.

Example 3c may include the wireless station of any of examples 1c and 2c, wherein the one or more processors are further configured to instruct a media signal corresponding to the media content be broadcast to a receiver node of the first network.

Example 4c may include the wireless station of the example 1c, wherein the wireless station previously handed over synchronization and a media resource location to the border node Example 5c may include the wireless station of any of examples 1c-4c, wherein the initial advertisement packet includes a PDU configured to cause the border node to synchronize the broadcast of the media content within the first network to the broadcast of the media content within the second network based on the PDU.

Example 6c may include the wireless station of any of examples 1c-5c, wherein the initial advertisement packet indicates a codec of the media content, a clock setting of the wireless station, a current timing of the media content within the first network, advertisement periods of time, and a name corresponding to the media content.

Example 7c may include the wireless station of example 6c, wherein the current timing of the media content includes a current media packet position corresponding to the media content.

Example 8c may include the wireless station of example 6c, wherein the name corresponding to the media content includes a uniform resource locator corresponding to the media content.

Example 9c may include the wireless station of any of examples 1c-8c, wherein the one or more processors are configured to detect the border node is within communication range by receiving a request signal from the border node.

Example 10c may include the wireless station of any of examples 1c-9c, wherein the subsequent advertisement packets indicate at least one of a codec, a streaming parameter of the media content, a clock setting of the wireless station, an updated timing of the media content within the first network, updated advertisement periods of time, and a name corresponding to the media content.

Example 11c may include the wireless station of any of examples 1c-10c, wherein the media content includes audio content.

Example 12c may include the wireless station of any of examples 1c-11c, wherein the media content includes a first audio content to be broadcast within the first network, a second audio content to be broadcast within the second network, and video content to be broadcast within the first network and the second network.

Example 13c may include a wireless station including one or more processors configured to: detect a border node of a first network is within communication range of the wireless station, the wireless station is within a second network that is different than the first network; receive an initial advertisement packet from the border node according to a Bluetooth low energy broadcast protocol; instruct broadcast of media content within the second network to be synchronized with broadcast of the media content within the first network based on the initial advertisement packet; and periodically receive subsequent advertisement packets to maintain synchronization of the broadcast of the media content within the first network and the second network.

Example 14c may include the wireless station of example 13c, wherein the initial advertisement packet is configured to cause the one or more processors to instruct broadcast of the media content to a receiver of the second network.

Example 15c may include the wireless station of any of examples 13c and 14c, wherein the initial advertisement packet includes a PDU and the one or more processors are configured to synchronize the broadcast of the media content within the second network to the broadcast of the media content within the first network based on the PDU.

Example 16c may include the wireless station of any of examples 13c-15c, wherein the initial advertisement packet indicates at least one of a codec of the media content, a codec parameter, a clock setting of the border node, a current timing of the media content within the first network, advertisement periods of time, and a name corresponding to the media content.

Example 17c may include the wireless station of example 16c, wherein the current timing of the media content includes a current media packet position corresponding to the media content.

Example 18c may include the wireless station of example 16c, wherein the name corresponding to the media content includes a uniform resource locator corresponding to the media content.

Example 19c may include the wireless stations of example 16c, wherein the clock setting of the border node includes a broadcasted packet counter incremented every broadcasted data packet to synchronize with a receiver.

Example 20c may include the wireless stations of example 15c, wherein the PDU includes a media type, a media payload, a codec information, and other parameters to synchronize the media content.

Example 21c may include the wireless station of example 14c wherein the receiver may apply corrections in case of loss of packet due to radio communication constraints, based on a counter, a clock, and other parameters, per a received PDU.

Example 22c may include the wireless station of example 14c, wherein the receiver applies packet loss concealment techniques as the PDU is tracked by looking at the PDU headers.

Example 23 c may include the wireless station of any of examples 13 c-22c, wherein the one or more processors are configured to detect the border node is within communication range by: instructing a request signal be provided; and receiving a response signal from the border node in response to the request signal.

Example 24c may include the wireless station of any of examples 13c-23c, wherein the border node autonomously determines whether a broadcaster that includes handover support is present by opening a periodic scanner to receive the PDU.

Example 25c may include the wireless station of example 24c, wherein an autonomous periodic scan of such support present in the existing range is determined.

Example 26c may include the wireless station of any of examples 13c-25c, wherein the subsequent advertisement packets indicate a codec of the media content, a clock setting of the wireless station, an updated timing of the media content within the first network, updated advertisement periods of time, and a name corresponding to the media content.

Example 27c may include the wireless station of any of examples 13c-26c, wherein the media content includes audio content.

Example 28c may include the wireless station of any of examples 13c-26c, wherein the media content includes a first audio content to be broadcast within the first network, a second audio content to be broadcast within the second network, and video content to be broadcast within the first network and the second network.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although aspects of the present disclosure have been described in detail, various changes, substitutions, and alterations could be made hereto without departing from the spirit and scope of the present disclosure.

What is claimed is:

1. A wireless station comprising one or more processors configured to:
   determine a border node of a second network is within communication range of the wireless station and the wireless station is within a first network that is different than the second network;
   instruct an initial advertisement packet be provided to the border node according to a Bluetooth low energy broadcast protocol, the initial advertisement packet being configured to cause the border node to synchronize broadcast of media content within the second network to broadcast of the media content within the first network; and periodically instruct subsequent advertisement packets be provided to the border node, the subsequent periodic advertisement packets configured to maintain synchronization of the broadcast of the media content within the first network and the second network.

2. The wireless station of claim 1, wherein the initial advertisement packet is configured to cause the border node to broadcast the media content to a receiver of the second network.

3. The wireless station of claim 1, wherein the one or more processors are further configured to instruct a media signal corresponding to the media content be broadcast to a receiver of the first network.

4. The wireless station of claim 1, wherein the initial advertisement packet comprises a protocol data unit (PDU) configured to cause the border node to synchronize the broadcast of the media content within the first network to the broadcast of the media content within the second network based on the PDU.

5. The wireless station of claim 1, wherein the initial advertisement packet indicates a codec of the media content, a clock setting of the wireless station, a current timing of the media content within the first network, advertisement periods of time, and a name corresponding to the media content.

6. The wireless station of claim 1, wherein the one or more processors are configured to detect the border node is within communication range by receiving a request signal from the border node.

\* \* \* \* \*